US010942926B2

(12) United States Patent
Valentin

(10) Patent No.: US 10,942,926 B2
(45) Date of Patent: Mar. 9, 2021

(54) IDENTIFICATION, AND QUERY, OF SEMANTICALLY-RELATED DATABASE TABLES

(71) Applicant: SAP SE, Walldorf (DE)

(72) Inventor: Marco Valentin, Malsch (DE)

(73) Assignee: SAP SE, Walldorf (DE)

( * ) Notice: Subject to any disclaimer, the term of this patent is extended or adjusted under 35 U.S.C. 154(b) by 220 days.

(21) Appl. No.: 16/122,566

(22) Filed: Sep. 5, 2018

(65) Prior Publication Data
US 2020/0073989 A1    Mar. 5, 2020

(51) Int. Cl.
*G06F 16/2455* (2019.01)
*G06F 16/248* (2019.01)
*G06F 16/22* (2019.01)
*G06F 16/242* (2019.01)

(52) U.S. Cl.
CPC .... *G06F 16/24558* (2019.01); *G06F 16/2282* (2019.01); *G06F 16/248* (2019.01); *G06F 16/2433* (2019.01)

(58) Field of Classification Search
None
See application file for complete search history.

(56) References Cited

U.S. PATENT DOCUMENTS

| 10,083,227 | B2 | 9/2018 | Valentin | |
| 2005/0223109 | A1* | 10/2005 | Mamou | G06F 16/254 709/232 |
| 2018/0060410 | A1* | 3/2018 | Stading | G06F 16/25 |
| 2019/0130029 | A1* | 5/2019 | Cai | G06F 16/316 |
| 2019/0171704 | A1* | 6/2019 | Buisson | G06F 40/131 |

OTHER PUBLICATIONS

Global Software, Inc., "Spreadsheet Server for Use with SAP," 10pp. (downloaded from the World Wide Web on Aug. 12, 2014).
Potharaju, "ABAP Query—A Step-by-Step guide," 7 pp. (document marked Sep. 5, 2007; downloaded from the World Wide Web on Aug. 12, 2014).

(Continued)

*Primary Examiner* — Uyen T Le
(74) *Attorney, Agent, or Firm* — Klarquist Sparkman, LLP

(57) ABSTRACT

Techniques and solutions are described for determining elements of different database tables have a semantic relationship, and optionally executing a value query using such tables. Tables, including those lacking a technical relationship (such as having a foreign key relationship or association) can be semantically related if an element of the table has the same semantic identifier, such as a domain, as an element of another table. The semantic relationship can exist even if other information, such as field names associated with a respective semantic identifier, are different between the two tables. A source table can be semantically related to one or more other tables, including indirectly based on semantic relationships between two or more of such other tables. Semantic table information can be recursively analyzed, including in a hierarchical manner, to identify a set of semantically related tables. The analysis can be constrained, such as to avoid loops or limit result size or running time.

20 Claims, 16 Drawing Sheets

(56) References Cited

OTHER PUBLICATIONS

SAP, "Administration Guide," online documentation for SAP Netweaver Enterprise Search, version 7.2, 90 pp. (downloaded from the World Wide Web on Aug. 13, 2014).
SAP, "Appendix," online documentation for SAP ERP, version 6.0, 15 pp. (downloaded from the World Wide Web on Aug. 13, 2014).
SAP, "Appendix," online documentation for SAP Netweaver Enterprise Search, version 7.2, 60 pp. (downloaded from the World Wide Web on Aug. 13, 2014).
SAP, "Developer's Guide," online documentation for SAP Netweaver Enterprise Search, version 7.2, 21 pp. (downloaded from the World Wide Web on Aug. 13, 2014).
SAP, "Getting Started Using the Search," online documentation for SAP Netweaver Enterprise Search, version 7.2, 6 pp. (downloaded from the World Wide Web on Aug. 13, 2014).
SAP, "InfoSet Query," online documentation for SAP ERP, version 6.0, 30 pp. (downloaded from the World Wide Web on Aug. 13, 2014).
SAP, "InfoSets," online documentation for SAP ERP, version 6.0, 35 pp. (downloaded from the World Wide Web on Aug. 13, 2014).
SAP, "Introducing SAP NetWeaver Enterprise Search," online documentation for SAP Netweaver Enterprise Search, version 7.2, 12 pp. (downloaded from the World Wide Web on Aug. 13, 2014).
SAP, "Overview," online documentation for SAP ERP, version 6.0, 6 pp. (downloaded from the World Wide Web on Aug. 13, 2014).
SAP, "Queries," online documentation for SAP ERP, version 6.0, 66 pp. (downloaded from the World Wide Web on Aug. 13, 2014).
SAP, "QuickViewer," online documentation for SAP ERP, version 6.0, 21 pp. (downloaded from the World Wide Web on Aug. 13, 2014).
SAP, "SAP Query," online documentation for SAP ERP, version 6.0, 2 pp. (downloaded from the World Wide Web on Aug. 12, 2014).
SAP, "SAP Query—SQ01, Step by Step Guide," 14 pp. (Aug. 2008).
Framework (SQL/Framework) Jan. 22, 2010, ISO/IEC, FCD 9075 1:2011 (E), 91 pages.
Information and Definition Schemas (SQL/Schemata) Jan. 22, 2010, ISO/IEC, FCD 9075-11:2-1(E), 299 pages.
Codd's Rule, tutorialcup.com, https://www.tutorialcup.dbms/codds-rule.html, at least as early as Sep. 4, 2018 9 pages.
Database Systems and Structures Summer 1998, Simon Fraiser University, http://www.cs.sfr.ca/CourseCentral/354/zaiane/material/notes/contents.html, 10 pages.
SQL SELECT date unknown [verified as of Aug. 28, 2013 on archive.org], 1keydata.com, http://www.1keydata.com/sql/sqlselect.html.4 pages.
SQL WHERE data unknown [verified as of Aug. 21, 2013 on archive.org], 1keydata.com, http://www.1keydata.com/sql/sqlwhere.html, 3 pages.
SQL CREATETABLE date unknown [verified as of Aug. 21, 2013 on archive.org] 1keydata.com, http://www.1keydata.com/sql/sqlcreate.html, 3 pages.
SQL CAST Function date unknown [verified as of Aug. 14, 2013 on archive.org] 1keydata.com, http://www.1keydata.com/sql/sqlcast.html, 3 pages.
A Brief History of PostgreSQL, postgresql.org, https://www.postgresql.org/docs/9.3/static/history.html, at least as early as Sep. 4, 2018, 3 pages.
Non-Final Office Action received in U.S. Appl. No. 14/459,183, dated Nov. 2, 2016, 25 pages.
Final Office Action received in U.S. Appl. No. 14/459,183, dated Mar. 24, 2017, 39 pages.
Appendix D, SQL Conformance, postgresql.org, https://www.postgresql.org/docs/9.2/static/features.html, at least as early as Sep. 4, 2018, 2 pages.
Chapter 34: The Information Schema, postgresql.org, https://www.postgresql.org/docs/9.2/static/information/schema.html, at least as early as Sep. 4, 2018, 3 pages.

Non-Final Office Action received in U.S. Appl. No. 14/459,183, dated Aug. 23, 2017, 34 pages.
Final Office Action received in U.S. Appl. No. 14/459,183, dated Dec. 26, 2017, 32 pages.
Schnell, Desktop search engine date unknown [captured by archive.org, on Aug. 2, 2013], schnell-web-net, https://www.web.archive.org/web/20130802110138/http://ilan.schnell-web.net/prog/search/, 1 page.
Notice of Allowance received in U.S. Appl. No. 14/159,183, dated Jun. 28, 2018, 22 pages.
SAP ABAP Data Dictionary, retrieved from: https://www.slideshare.net/revanthnagaraju/sap-abap-data-dictionary, Aug. 19, 2014, 13 pages.
SAP ABAP—Domains, retrieved from https://www.tutorialspoint.com/sap_abap/sap_abap_domains.htm, at least as early as Sep. 4, 2018, 1 page.
Domains, SAP, retrieved from: https://help.sap.com/saphelp_nw73ehp1/helpdata/en/cf/21ede5446011d189700000e8322d00/frameset.htm, at least as early as Sep. 4, 2018, 3 pages.
Domains, retrieved from: https://help.sap.com/doc/saphelp_nw70ehp1/7.01.16/en-US/cf/21ede5446011d189700000e8322d00/content.htm?no_cache=true, at least as early as Sep. 4, 2018, 1 page.
Creating a 'Data Element', SAP, retrieved from: http://way2abap.blogspot.com/p/creat.html, at least as early as Sep. 4, 2018, 5 pages.
SAP DataSheet, retrieved from: https://www.sapdatasheet.org/abap/dtel/domname.html, at least as early as Sep. 4, 2018, 2 pages.
Contents of data dictionary, retrieved from: https://archive.sap.com/discussions/thread/765557, May 3, 2008, 7 pages.
SAP—Type of DDIC Table, SAPApplication.com, retrieved from: http://www.sapapplication.com/ddic-table-type.php, © 2011, 1 page.
Semantic Attributes of Data Elements, SAP NetWeaver AS ABAP Release 750, retrieved from: https://help.sap.com/doc/abapdocu_750_index_htm/7.50/en-US/abenddic_data_elements_sema.htm, © 2016 SAP AG, 2 pages.
SAP R/3 Black Book, Google Books, https://books.google.com/books?id=LDyarcerUu0C&pg=PA305&lpg=PA305&dq=sap+technical+information+semantic+information&source=bl&ots=vl7eXO7etp&sig=mcnJKjg7Rdac2bbGnEJ3o57oZWk&hl=en&sa=X&ved=2ahUKEwihmKjXvrjcAhUHHjQIHWzxASUQ6AEwDXoECAMQAQ#v=onepage&q=semantic&f=false, © 2006 by Dreamtech Press, Cover, Copyright Page and select pages, 3 pages.
Thomas, Introduction to Semantic Events and Attributes, SAP, retrieved from,: https://blogs.sap.com/2016/05/18/introduction-to-semantic-events-and-attributes/, May 18, 2016, 1 page.
Difference of data element and domain, retrieved from: https://archive.sap.com/discussions/thread/711138, Jun. 22, 2008, 6 pages.
Semantics Annotation, SAP—ABAP Programming Model for SAP Fiori, retrieved from: https://help.sap.com/viewer/cc0c305d2fab47bd808adcad3ca7ee9d/7.51.6/en-US/fbcd3a59a94148f6adad80b9c97304ff.html, at least as early as Sep. 4, 2018, 12 pages.
SAP ABAP: Hands-On Test Projects with Business Scenarios, https://books.google.com/books?id=iV8wBQAAQBAJ&pg=PA29&lpg=PA29&dq=sap+define+domain+%22properties+tab%22&source=bl&ots=I33JbQI3W7&sig=_k6fGVsmDawfK-TpCjuNytWJJV4&hl=en&sa=X&ved=2ahUKEwinjvK_oLbcAhXyCTQIHUnwDlIQ6AEwA3oECAAQAQ#v=onepage&q=conversion%20routine&f=false, 2014, 1 page.
Creating Data Elements, retrieved from: https://help.sap.com/saphelp_crm70/helpdata/en/90/8d7307b1af11d194f600a0c929b3c3/content.htm?loaded_from_frameset=true, at least as early as Sep. 4, 2018, 3 pages.
Data Element vs Domain, SAP, retrieved from: https://archive.sap.com/discussions/thread/821139, Apr. 14, 2008, 4 pages.
Altaf, Introduction to the Abap Data Dictionary and Managing Data Dictionary Objects, retrieved via Wayback Machine, https://www.insider-books.com/blogs/2-insiderbooks-articles-and-insights/post/179-introduction-to-the-abap-data-dictionary-and-managing-data-dictionary-objects, Feb. 27, 2017, 3 pages.
Data Elements, retrieved from: https://help.sap.com/doc/saphelp_nw73ehp1/7.31.19/en-US/90/8d72feb1af11d194f600a0c929b3c3/content.htm?no_cache=true, at least as early as Sep. 4, 2018, 2 pages.

(56) References Cited

OTHER PUBLICATIONS

Defining Data Object Node Attributes, retrieved from: https://help.sap.com/doc/saphelp_nw73ehp1/7.31.19/en-US/47/a8289306cd2af3e10000000a42189b/content.htm?no_cache=true, at least as early as Sep. 4, 2018, 3 pages.

Data Element, SAP, retrieved from: https://archive.sap.com/discussions/thread/115815, Feb. 28, 2016, 4 pages.

Sap R/3 Black Book, https://books.google.com/books?id=LDyarcerUu0C&pg=PA287&lpg=PA287&dq=sap+%22data+element%22+%22attributes+tab%22&source=bl&ots=v17eWQ91sm&sig=lKPaspz3dNdDfZSiQPBrzWh-r4o&hl=en&sa=X&ved=2ahUKEwiY9b3VnrbcAhVRHDQIHWxrCNkQ6AEwCHoECAgQAQ#v=onepage&q=sap%20%22data%20element%22%20%22attributes%20tab%22&f=false, © 2006 by Dreamtech Press, Cover, Copyright Page and select pages., 4 pages.

Gupta, ABAP Data Dictionary, Book, Galileo Press https://s3-eu-west-1.amazonaws.com/gxmedia.galileo-press.de/leseproben/2540/sappress_abap_data_dictionary.pdf, 34 pages.

SAP ABAP Data Element USMD_FLD_PROP (Field Properties) retrieved from: https://www.sapdatasheet.org/abap/dtel/usmd_fld_prop.html, at least as early as Sep. 4, 2018, 4 pages.

BC-ABAP Dictionary, retrieved from: https://www.consolut.com/fileadmin/user_upload/SAP_PrintDoku/en/BCDWBDIC/BCDWBDIC.PDF, at least as early as Sep. 4, 2018, 303 pages.

SAP, "Administration," online documentation for SAP ERP, version 6.0, 22 pp. (downloaded from the World Wide Web on Aug. 13, 2014).

E.36, Release 9.2, postgresql.org, https://www.postgresql.org/docs/9.3/static/release-9-2.html, accessed at least as early as Sep. 4, 2018, 21 pages.

E.16, Release 9.3, postgresql.org, https://www.postgresql.org/docs/9.3/static/release-9-3-10.html, accessed at least as early as Sep. 4, 2018, 3 pages.

PostgreSQL 9.3.25 Documentation, The Postgre SQL Global Development Group, https://www.postgresql.org/files/documentation/pdf/9.3/postgresql-9.3-A4.pdf, accessed at least as early as Sep. 4, 2018, 3002 pages.

Teevan et al., The Perfect Search Engine is not Enough: A Study in Orienteering Behavior in Directed Search Apr. 24-29, 2004, Proceedings of the SIGCHI Conference on Human Factors in Computing Systems, CHI '04, pp. 415-422.

What is the function of a Domain in SAP Data Dictionary, retrieved from: https://www.sapnuts.com/faq/What-is-the-function-of-a-Domain-in.html, Jan. 29, 2014, 3 pages.

SAP ABAP Domains—Tutorialspoint, retrieved from: https://www.tutorialspoint.com/sap_abap/sap_abap_domains.htm, accessed at least as early as Sep. 4, 2018, 4 pages.

Unit 3—Transparent tables in the ABAP Dictionary, retrieved from: https://www.slideshare.net/dubon07/unit-3-transparent-tables-in-the-abap-dictionary, May 3, 2016, 30 pages.

What is Data element in SAP?, SAP Tech Concepts, retrieved from: https://saptechconcepts.weebly.com/home/what-is-data-element-in-sap, Jun. 12, 2014, 2 pages.

* cited by examiner

```
*.now determine domains for fields of table
    CALL FUNCTION 'DDIF_FIELDINFO_GET'
      EXPORTING
        tabname        = ld_tab
      TABLES
        dfies_tab      = lt_dfies
      EXCEPTIONS
        not_found      = 1
        internal_error = 2
        OTHERS         = 3.

REFRESH et_tables.
```

FIG. 8A

```
*.now get all tables that fit to each single entity
    LOOP AT it_sel_tab INTO ls_sel_tab
              WHERE field <> '$tabname'.
*...check if the entity is given as technical fieldname or as text
      READ TABLE lt_dfies INTO ls_dfies
                   WITH KEY fieldname = ls_sel_tab-field.
*...entity is given as field name -> technical information available
*...limit search to domains
      IF sy-subrc = 0.
        ld_value = ls_dfies-domname.
        REFRESH: lt_tables.
*.....in case of domain search, do simple select
        PERFORM rri_get_ddftx_from_domname USING ld_value
                                                 i_noview
                                        CHANGING lt_tables
                                                 it_dev
                                                 it_tab
                                                 it_view_whitelist.

FORM rri_get_ddftx_from_domname USING VALUE(p_domname)
                                            VALUE(p_noview)
                                   CHANGING lt_tables TYPE se16s_search_area_t
                                            r_devcl   TYPE se16s_dev_t
                                            r_table   TYPE se16s_tab_t
                                            r_view    TYPE se16s_tab_t.

DATA: ld_len    LIKE sy-tabix.
        DATA: ld_continue(1).
        DATA: lt_where TYPE TABLE OF string.
        DATA: ls_where TYPE string.

IF p_noview = true.
          ls_where = |t~tabclass = 'TRANSP'|.
          APPEND ls_where TO lt_where.
        ELSE.
          ls_where = |t~tabclass = 'TRANSP' OR|.
          APPEND ls_where TO lt_where.
          ls_where = |( t~tabclass  = 'VIEW' AND t~viewclass = 'D' )|.
          APPEND ls_where TO lt_where.
        ENDIF.
```

FIG. 8B

```
*.search for field texts
  SELECT DISTINCT c~tabname  AS tabname,
                  t~tabclass AS tabclass,
                  tx~ddtext  AS ddtext
     APPENDING CORRESPONDING FIELDS OF TABLE @lt_tables
         FROM ddftx AS c
     LEFT OUTER JOIN dd02t AS tx
             ON tx~tabname = c~tabname
             AND tx~ddlanguage =  @sy-langu
     INNER JOIN dd02l AS t ON t~tabname = c~tabname
     INNER JOIN tadir AS p ON p~obj_name = c~tabname
              WHERE domname   = @p_domname
                AND t~tabname    IN  @r_table
                AND p~devclass   IN  @r_devcl
*              AND c~ddlanguage =  @sy-langu
                AND (lt_where).                    "#EC CI_BUFFJOIN

*.now check if whitelist of views is active
     IF p_noview <> true AND
       NOT r_view[] IS INITIAL.
*...now delete all views that are not in the white list
      DELETE lt_tables WHERE tabclass = 'VIEW'
                         AND NOT tabname IN r_view.
     ENDIF.

SORT lt_tables BY tabname ASCENDING.

ENDFORM.                    " RRI_GET_DDFTX_FROM_DOMNAME
```

FIG. 8C

```
     LOOP AT lt_tables INTO ls_tables.
       READ TABLE et_tables INTO es_tables
                  WITH KEY tabname = ls_tables-tabname.
*.......table already exists, add 1 to count
         IF sy-subrc = 0.
           ld_tabix_fix = sy-tabix.
           ADD 1 TO es_tables-entity_nr.
*..............store highest possible entity number
           IF es_tables-entity_nr > ld_max_entity.
             ld_max_entity = es_tables-entity_nr.
           ENDIF.
           ls_entity-field = ls_dfies-domname.
           APPEND ls_entity TO es_tables-entity_name.
           REFRESH: lt_selfields, lt_or_selfields, lt_and_selfields.
*...........determine the names of the fields fitting to domname
           PERFORM rri_get_fieldnames TABLES lt_selfields
                                      USING ls_tables-tabname
                                            ls_dfies-domname.
```

FIG. 8D

```
*............it could be that some tables have several fields of the
*............same domain --> fill all these fields
            lt_or_selfields_old = es_tables-lt_or.
            LOOP AT lt_selfields INTO ls_selfields.
               ls_selfields-sign   = ls_sel_tab-sign.
               ls_selfields-option = ls_sel_tab-option.
               ls_selfields-low    = ls_sel_tab-low.
               ls_selfields-high   = ls_sel_tab-high.
               MODIFY lt_selfields FROM ls_selfields INDEX sy-tabix.
*..............now each field needs to be filled in each OR-Line again
               LOOP AT lt_or_selfields_old INTO ls_or_selfields_old.
                  APPEND ls_selfields TO ls_or_selfields_old-seltab.
                  APPEND ls_or_selfields_old TO lt_or_selfields.
               ENDLOOP.
            ENDLOOP.
            es_tables-lt_or = lt_or_selfields.
            MODIFY et_tables FROM es_tables INDEX ld_tabix_fix.

*........table does not yet exist, add it
         ELSE.
            ls_tables-entity_nr = 1.
*..............store highest possible entity number
            IF ls_tables-entity_nr > ld_max_entity.
               ld_max_entity = ls_tables-entity_nr.
            ENDIF.
            ls_entity-field = ls_dfies-domname.
            APPEND ls_entity TO ls_tables-entity_name.
            REFRESH: lt_selfields, lt_or_selfields, lt_and_selfields.
*............determine the names of the fields fitting to domname
            PERFORM rri_get_fieldnames TABLES lt_selfields
                                      USING ls_tables-tabname
                                            ls_dfies-domname.
*............it could be that some tables have several fields of the
*............same domain --> fill all these fields into or-structure
            LOOP AT lt_selfields INTO ls_selfields.
               ls_selfields-sign   = ls_sel_tab-sign.
               ls_selfields-option = ls_sel_tab-option.
               ls_selfields-low    = ls_sel_tab-low.
               ls_selfields-high   = ls_sel_tab-high.
               MODIFY lt_selfields FROM ls_selfields INDEX sy-tabix.
               CLEAR ls_or_selfields.
               APPEND ls_selfields TO ls_or_selfields-seltab.
               APPEND ls_or_selfields TO lt_or_selfields.
            ENDLOOP.
            ls_tables-lt_or = lt_or_selfields.
            APPEND ls_tables TO et_tables.
         ENDIF.
      ENDLOOP.
```

FIG. 8E

```
*..recursively call the same as long as the newly found tables have
*..dependencies
  IF NOT et_tables_new[] IS INITIAL.
*.update local information in GSS_RFC_LOCAL in case this is an RFC
    IF NOT p_rfc_key IS INITIAL.
      CLEAR ls_rfc_local.
      SELECT SINGLE * FROM gss_rfc_local INTO ls_rfc_local
               WHERE key_id            = p_local_key
                 AND call_id            = p_rfc_key
                 AND rfc_dest_forward  = p_local_dest.
      ls_rfc_local-change_time       = sy-timlo.
      ADD 1 TO ls_rfc_local-updates.
      MODIFY gss_rfc_local FROM ls_rfc_local.
      COMMIT WORK AND WAIT.
    ENDIF.
    PERFORM det_dep_tables_iteration
                    USING     p_scenario
                              ld_cluster
                              r_clst
                              p_maxrows
                              p_langu
                              p_only_single_rfc
                              p_rfc_key
                              p_master_key
                              p_local_dest
                              p_local_dest_back
                              p_local_key
                              p_simulation
                              p_stop_level
                              p_no_rfc
                    CHANGING  ld_nr_of_tables
                              p_level
                              p_internal_level
                              lgd_dep_id
                              lgd_rfc_id
                              et_tables_new
                              et_tables.
  ENDIF.
```

FIG. 8F

IDENTIFICATION, AND QUERY, OF SEMANTICALLY-RELATED DATABASE TABLES

FIELD

The present disclosure generally relates to analyzing relationships between data in a database. Particular implementations relate to identifying database tables that have a semantic relationship.

BACKGROUND

Ever increasing amounts of data are becoming available, from an increasing variety of sources. For example, almost all aspects of a person's life are associated with data in a computing device, including through the advent of social media and internet of things (JOT) devices. Data is typically stored in multiple repositories, such as individual tables in a relational database system. Identifying relationships between data in different database tables can be difficult. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for determining elements of different database tables having a semantic relationship, and optionally executing a value query using such tables. Tables, including those lacking a technical relationship (such as having a foreign key relationship or association) can be semantically related if an element of the table has the same semantic identifier, such as a domain, as an element of another table. The semantic relationship can exist even if other information, such as field names associated with a respective semantic identifier, are different between the two tables. A source table can be semantically related to one or more other tables, including indirectly based on semantic relationships between two or more of such other tables. Semantic table information can be recursively analyzed, including in a hierarchical manner, to identify a set of semantically related tables. The analysis can be constrained, such as to avoid loops or limit result size or running time.

In one embodiment, a disclosed method includes operations that can be carried out to identify semantically related tables. One or more database table identifiers are received, such as from a user through a user interface. For a first database table of a plurality of database tables, the first database table is set as a current database table. The first database table is associated with a first database table identifier of the one or more database table identifiers.

First analysis operations are carried out for the current database table. The first analysis operations include retrieving a first plurality of domains, the first plurality of domains being associated with respective fields of the current database table. The first analysis operations include setting a current set of domains to the first plurality of domains. The first analysis operations further include, for at least a portion of the current set of domains, carrying out second analysis operations. The second analysis operations include determining one or more other database tables of the plurality of database tables having a domain currently being analyzed. The second analysis operations include, for a determined database table, the determined database table being a next database table and the database table having the domain currently being analyzed being a prior database table, carrying out third analysis operations.

The third database operations include one or both of adding an identifier of a determined table to a set of semantically related database tables or performing a value query on the determined table and adding query results to a set of value query results. The next database table is set as the current database table and the first analysis operations are carried out for the current database table.

It is determined that no further domains of the current table remain to be analyzed. The prior table is set as the current table. The first analysis operations are resumed for the current table. It is determined that no database table associated with the one or more database table identifiers has domains left to be analyzed. One or both of the set of semantically related tables or the value query results are returned.

In another aspect, operations can be carried out to identify semantically related tables. A specification of one or more database table to be analyzed is received. First semantic information for the one or more database tables to be analyzed is retrieved. One or more database tables that are semantically related to at least a portion of the first semantic information are recursively analyzed. At each level of recursion, one or more tables are analyzed to determine whether other database tables have semantic information matching semantic information of the database table being analyzed, the analysis proceeding to the next level of recursion for any matching database tables and performing one or more of adding matching tables to a set of semantically related tables or performing a value query on matching tables, and returning to the prior level of recursion when no more domains remain to be analyzed for the current level of recursion. One or both of the set of semantically related tables or value query results are returned.

In a further aspect, operations can be carried out to identify semantically related tables. One or more database table identifiers are received, such as from a user through a user interface. For a first database table of a plurality of database tables, the first database table is set as a current database table. The first database table is associated with a first database table identifier of the one or more database table identifiers.

First analysis operations are carried out for the current database table. The first analysis operations include retrieving a first plurality of semantic identifiers, the first plurality of semantic identifiers being associated with respective fields of the current database table. The first analysis operations include setting a current set of semantic identifiers to the first plurality of semantic identifiers.

The first analysis operations further include, for at least a portion of the current set of semantic identifiers, carrying out second analysis operations. The second analysis operations include determining one or more other database tables of the plurality of database tables having a semantic identifier currently being analyzed. The second analysis operations include, for a determined database table, the determined database table being a next database table and the database table having the semantic identifier currently being analyzed being a prior database table, carrying out third analysis operations.

The third database operations include one or both of adding an identifier of a determined table to a set of semantically related database tables or performing a value query on the determined table and adding query results to a set of value query results. The next database table is set as the current database table and the first analysis operations are carried out for the current database table.

It is determined that no further semantic identifiers of the current table remain to be analyzed. The prior table is set as the current table. The first analysis operations are resumed for the current table. It is determined that no database table associated with the one or more database table identifiers has semantic identifiers left to be analyzed. One or both of the set of semantically related tables or the value query results are returned.

The present disclosure also includes computing systems and tangible, non-transitory computer readable storage media configured to carry out, or including instructions for carrying out, an above-described method (or operations). As described herein, a variety of other features and advantages can be incorporated into the technologies as desired.

BRIEF DESCRIPTION OF THE DRAWINGS

FIGS. 8A-8F are example ABAP code providing a specific implementation of disclosed technologies.

DETAILED DESCRIPTION

Example 1—Overview

Figure 1:
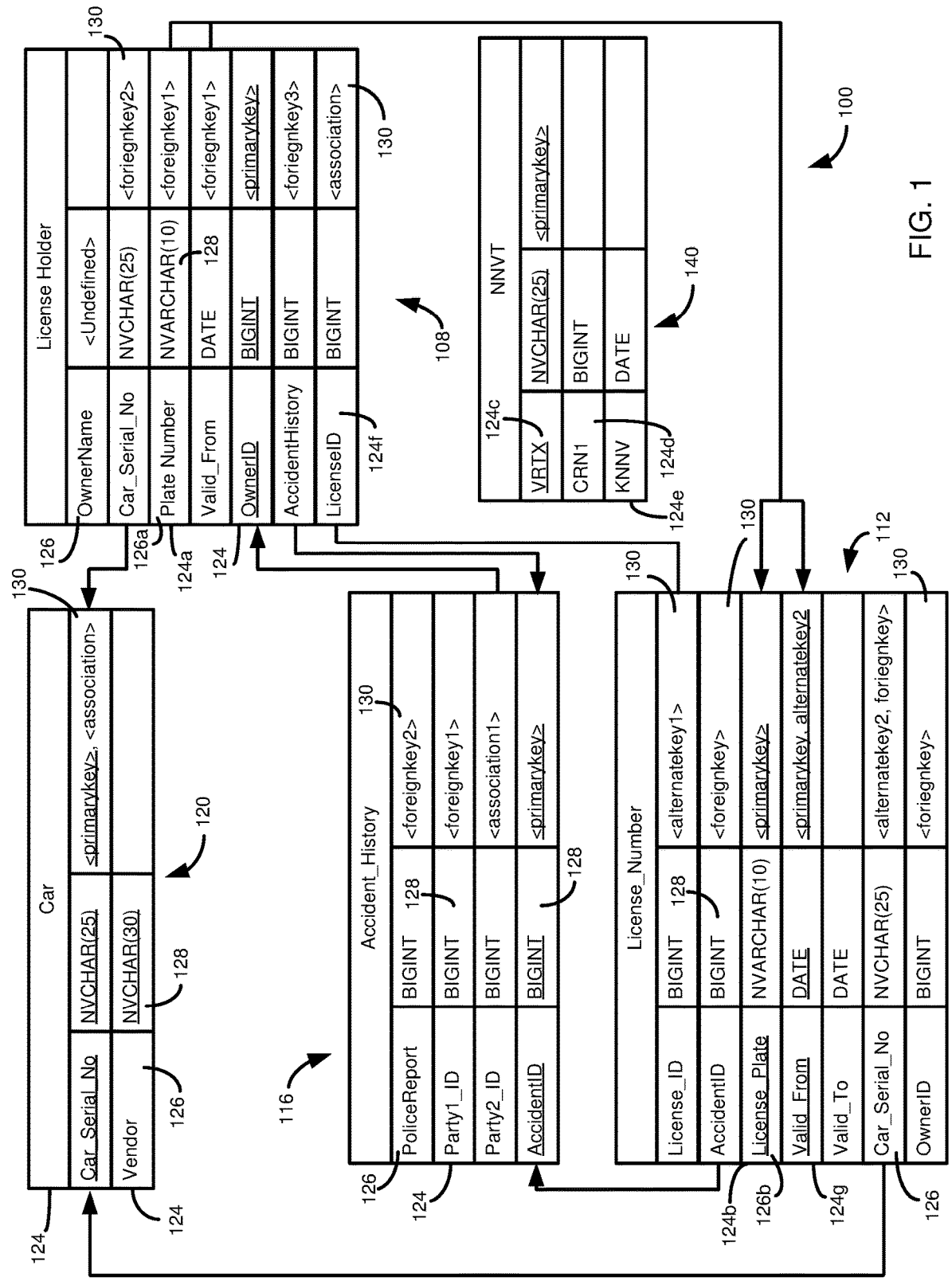
FIG. 1 is a diagram of a database schema showing technical relationships between at least a portion of database tables in the schema.

Ever increasing amounts of data are becoming available, from an increasing variety of sources. For example, almost all aspects of a person's life are associated with data in a computing device, including through the advent of social media and internet of things (IOT) devices. Data is typically stored in multiple repositories, such as individual tables in a relational database system. Identifying relationships between data in different database tables can be difficult.

Identifying related data can be important for a variety of reasons. One such reason is that at least some governmental organizations are becoming increasingly concerned about data gathered regarding private individuals and how that data is maintained, used, and shared. For example, the General Data Protection Regulation recently came into effect, which has affected companies operating from within the European Union, but in many other jurisdictions as well. Some governmental regulations provide that a user can request information from an organization that has collected the user's data. The report, in at least some cases, must be understandable to the user, and summarize what information the organization has collected (or otherwise possesses) regarding the user, and for what purpose. A user may be allowed request that an organization "forget" the user's data, at least when the organization no longer has a legal right to possess particular data. Relatedly, regulations may provide that organizations are only allowed to use particular data for particular purposes, and not for other purposes.

It can be difficult to determine all data that might be relevant for a particular purpose, such as all data possessed by an organization regarding a particular individual. For instance, the user may be associated with the organization in multiple aspects or roles, such as being both a customer and an employee. Even for a particular aspect or role, data may be stored in different systems or be accessible through different applications such that a search in any one system or application may not retrieve all relevant data.

Relatedly, a database that stores information may not have been designed to facilitate such data retrieval. That is, database systems are typically designed, such as using tools like entity-relation diagrams, for a particular purpose. Designing a database system for a particular purpose can result in faster, more accurate, and more efficient data retrieval, such as through the process of normalization. However, by definition then, the resulting database schema is not designed for other purposes, and issues may arise in trying to use a database schema for a purpose for which it was not intended. At best, queries for the "new" purpose may be overly complicated or inefficient. At worst, it may not be possible to retrieve data, at least not accurately, for the new purpose.

Even assuming all information related to a request could be identified, simply identifying the information may not be sufficient to satisfy legal requirements, or another purpose. For instance, at least some data privacy regulations can require an organization having data relating to an individual to explain the purpose of the data. Simply returning the data, in most cases, will not inform the user regarding why their data was collected, or how it was used. Databases, in some cases, may be set up (e.g., via a schema) to capture technical relationships between database tables, such as through the use of foreign key relationships. However, databases are typically not set up to retrieve data based on semantic relationships between data.

Database systems typically include an information repository that stores information regarding a database schema. For instance, PostgreSQL includes an INFORMATION_SCHEMA that includes information regarding tables in a database system, and certain table components, such as attributes (or fields) and their associated datatypes (e.g., varchar, int, float). Other database systems, or query languages, include similar concepts. However, as described above, these types of repositories typically only store technical information regarding database components, not semantic information.

Other database systems, or applications or frameworks that operate using a database layer, may include repositories that store semantic information for data. For instance, SAP SE of Walldorf, Germany, provides the ABAP programming language which can be used in conjunction with database systems. ABAP provides the ability to develop database applications that are agnostic to the nature, including vendor, of the underlying relational database management system. In part, this ability is enabled using a data dictionary. The data dictionary can include at least some information that is similar to information that is maintained in an information schema. However, the data dictionary can include semantic information regarding data, and optionally additional technical information.

In addition, the data dictionary can include textual information regarding fields in a table, such as human-readable descriptions (sometimes in different languages, such as English, French, or German) of the purpose or use of the field. In at least some cases, the textual information can serve as semantic information to a computer. However, other types of semantic information need not necessarily be (at least easily) human-understandable, but can be easier for a computer to process than parsing textual information primary intended for human use. Data dictionaries can also contain or express relations between data dictionary objects through various properties (which can be reflect in metadata), such as having the data dictionary reflect that dictionary objects are assigned to packages, and thus having a relationship to one another through a package assignment.

As used herein, "technical information" (or technical metadata) relates to information that describes data as data, which is information such as a type that can be used to interpret a value of the data, and which can influence how the data is processed. For instance, the value "6453" could be interpreted (or cast) as an integer, a float, a string, or an array of characters, among various possibilities. A value may be processed differently, in some cases, depending on whether it is a number, such as an integer or a float, or whether it is treated as a collection of characters. Similarly, technical information can specify acceptable values for data, such as a length or a number of decimal places that are allowed. The technical information can specify properties of the data without concern regarding what the data represents or "means." Of course, however, a designer of a database system can select particular technical properties for particular data knowing themselves the semantic properties of the data—e.g., "If I intend to have a value representing a person's name, I should use a string or array of characters rather than a float." On the other hand, in at least some cases, data types might be a type that would not be expected by a database administrator or user. For instance, rather than using a person's name to identify data associated with the person, a separate numerical or alphanumerical identifier might be used, which might be counter intuitive based on the "meaning" of the data (e.g., "I do not consider myself to be a number").

As used herein, "semantic information" (or semantic metadata) relates to information that describes the meaning or purpose of data, which meaning or purpose can be to a human or to a computer process. As an example, technical data information may specify that data is obtained having a value in the format "XXX-XX-XXXX," where X is an integer between 0 and 9. That technical information can be used to determine how the data should be processed, or whether a particular value is valid (e.g., "111-11-1111" is, but "1111-11-1111" is not), but does not indicate what the value represents. Semantic information associated with the data can indicate whether the value is a social security number, a telephone number, a routing address, etc.

Semantic information can also describe how data is to be processed or displayed. For instance, "knowing" that data is a telephone number may cause the value to be displayed in one part of a GUI as opposed to another part of a GUI, or may invoke or not invoke particular processing rules depending on if the rule is active for "telephone number." In at least some cases, "semantic information" can include other types of information that can be used to describe data, or how it should be used or processed. In a particular case, data can be associated with one or more of a label, such as a human understandable description of the data (e.g., "telephone number"), documentation, such as a description of what information should be included in a field having the label (e.g., "enter an 11 digit phone number including area code"), or information that can be used in a help screen (e.g., "enter your home phone number here").

Typically, technical information must be provided for data. In the case of a field of a database table, for example, it is typically necessary to provide a name or identifier for a field and a datatype. The name or identifier for a field might, or might not, serve to provide semantic information. That is, a database designer might choose a name of "Employee_Name," "EMPN," or "3152." However, as the name or identifier is used to locate/differentiate the field from another field, in the context of the present disclosure, it is considered to be technical information, rather than semantic information, even if it may readily convey meaning to a human. In at least some implementations, the use of semantic information is optional. For instance, even using the data dictionary, some fields used in database objects (such as tables, but potentially other objects too, where such other objects are typically associated with one or more tables in an underlying relational database system) can be specified without the use of semantic information, while other fields are associated with semantic information.

Disclosed technologies allow for database elements (e.g., fields of particular tables, data objects based on those fields, and particular instances, or values, of the fields) to be located that have a semantic relationship, when such data elements are located in different repositories, such as being located in different database tables. In at least some cases, a first table element of a first repository is related to a second table element of a second repository based on semantic information, but the first and second table elements are not related using technical information. That is, for example, the first table element is not a foreign key (or similar association) that references the second table element.

Although some database related systems, such as those including a data dictionary, have included semantic information, such information has not previously been used to identify semantically related table elements among multiple data repositories (e.g., tables). In a particular aspect, database elements include a particular semantic identifier referred to as a "domain." As will be described in more detail, a domain can be used, at least in part, to define data elements, where data elements can in turn be used to define database fields, which in turn can be used as components of database tables. At least some tables having fields with common domains can be identified as being semantically related.

The present disclosure can involve two or more types of queries, which can be carried out sequentially or concurrently. A semantic or metadata query can be used to determine semantic relationships between tables, without actually retrieving or analyzing values in the tables. The semantic query can be used to define a search area, and can use a search area string (e.g., keywords) provided by an application or user, or an appropriate statement in a query language. A value or data query can be used to retrieve or analyze values in a set of semantically related tables, and can use one or more search strings or one or more appropriate query language statements (e.g., SELECT statements).

When a value query is performed, data from semantically related tables can be retrieved or analyzed using the query. In this way, queries for related data can return more comprehensive and accurate results. Such results can be useful in a number of contexts, including complying with data collection and data privacy regulations. For example, an "employee" table may have a field with a value of "1," and another table, such as a "department" table, may indicate that "1" is associated with "manufacturing." Thus, without accessing the "department" table, it may not be clear what data the employee table really includes, or what the data means.

In particular embodiments, semantic relationships between database elements (e.g., tables, fields) can be determined in a recursive manner. For example, it may be determined that a first table is semantically related to a second table by a first domain. The second table may have a field associated with a second domain. The second table may be semantically related to a third table through the second domain. Whenever a new table is identified as having a semantic relationship with a previously analyzed table, domains of the new table can be analyzed for relationships with additional tables. This process can occur at each level of analysis. When no new tables are identified, the process can revert to the prior level, eventually returning to the first table and terminating when no additional fields of the first table remain to be analyzed.

In some cases, semantic relationships between database elements or objects can be determined and stored for later use. For instance, such as if a schema is fairly static, a list of related tables can be determined and stored. Queries (e.g., value queries) can then be issued against the identified tables as desired. Or, a view of table relations can be provided to a user, including for use in generating queries. In other cases, relationships between tables can be generated in conjunction with value query execution, where values matching particular criteria are determined and returned as relationships between tables are determined and followed.

The disclosed technologies can provide a number of advantages. For instance, automatically determining semantic relationships between database objects and elements can be carried out more efficiently and accurately than through manual analysis (e.g., manual tracing of relationships in a data dictionary or information schema). The disclosed techniques can also be more efficient than other types of automated searching, such as searching all tables, or otherwise processing values that have no semantic relationship. Data protection and data privacy is a technical area of increasing relevance, and disclosed technologies provide improved techniques for complying with data protection and data privacy regulations. Thus, not retrieving or returning data values that are not semantically related can help avoid legal violations and can improve data privacy and security.

The disclosed technology can be useful, however, in areas outside of data protection and data privacy. In particular, the disclosed technologies can be useful when semantically related data is to be queried, but a database schema lacks technical information to capture such semantic relations, or was otherwise not constructed with such data retrieval in mind. For instance, when multiple database systems are being merged, or split, data may need to be converted, replaced, or deleted. It can be difficult to make appropriate changes for such comprehensive/voluminous data, as the data may not have been organized to facilitate such changes. Accordingly, it can be a tremendous amount of work to merge/split database systems, and the process can be error prone. The above-described technologies can be used to identify relevant data, and to update, delete, move, or make other changes to such data.

Disclosed technologies can also be useful in finding related data, in general, in a database system, such as when no standard query exists. That is, for example, typically software applications will include at least some predefined queries to help a user accomplish a particular task. Often, technical details of database access are hidden from a user. That is, a user may request to see data relating to a particular work order, and the data may be populated to fields of a graphical user interface without the end user having any idea of what database is being accessed, how the records are maintained, or a query language statement used to retrieve the data. Typically, if such an application does not include an appropriate pre-defined query, either the user must manually formulate the query, if a query interface is even provided, or is simply unable to retrieve the desired data. Disclosed technologies can provide a wizard, or similar interface, that can facilitate a user in finding semantically related data without having to provide the user with a full query interface and without the user having to be familiar with query formulation, or an underlying database system (e.g., table names, fields, etc.).

The disclosed technologies can be applied in data forensics and fraud management. For example, in some instances, fraud may be identified by cross referencing tables, or particular table fields, that are not normally associated with one another. As an example, if an employee has a company credit card that can be used for gas purchases, it may not be detectable that the employee is fraudulently using the card for personal purposes (e.g., filling up their own private car or a spouse's car) simply by examining the credit card charges. However, cross-referencing those charges with mileage reports from a motor pool can identify that the charges for gasoline exceeded the amount of gasoline needed to travel the number of miles reported in the motor pool records. Semantic information, such as an employee identifier, can be used to locate records for the same employee identifier which are typically maintained or accessed by different end users or different systems, and to identify interrelated data.

Example 2—Example Database Schema with Technical Relationships

FIG. 1 is an example entity-relation (ER) type diagram illustrating a data schema 100 related to a driver's accident history. The schema 100 (which can be part of a larger schema, the other components not being shown in FIG. 1) can include a table 108 associated with a license holder (e.g., an individual having a driver's license), a table 112 associated with a license, a table 116 representing an accident history, and a table 120 representing cars (or other vehicles).

Each of the tables 108, 112, 116, 120 can include a plurality of fields 124. Each field 124 can be associated with technical information, such as a name or identifier 126, a datatype 128, and a flag or status indicator 130 indicating whether the field represents a primary key, indicates a foreign key relationship with another table, or indicates another type of technical relationship with another table. The flag 130 represents technical information that can be used to link two or more tables, including linking particular fields 124 of particular tables.

Schema information with technical information is typically maintained in a database layer, such as a software layer associated with where table values are maintained (e.g., in a RDBMS), and typically includes identifiers for the tables 108, 112, 116, 120, and the name 126 and datatype 128 of their associated fields 124. Schema information may also include at least some of the information conveyable using the flag 130, such as whether a field is associated with a primary key, or indicating a foreign key relationship. However, other relationships, including more informal associations, may not be included in a schema associated with a database layer (e.g., the INFORMATION_SCHEMA of PostgreSQL).

Database layer schema information typically does not include semantic information. Although, in the particular example shown, the fields 124 have names 126 that at least suggest the meaning of their content, in many database schemas, the fields do not have names which convey the meaning of a field. In any event, fields 124 having the same semantic information, or having at least some semantic information in common, may have different technical information. For example, field 124a has the name 126a of "Plate Number," which may or may not have the same semantic meaning as field 124b with the name 126b of "License Plate." A search of the database for information regarding "License Plate" may retrieve records associated with name 126b, but may miss records with the name 126a. The converse can also be true, where a search for "License Plate" may retrieve records from two tables, even though the term has different semantic meanings in the two fields. That is, two fields may have the same name by coincidence (or through a design that simply is not concerned about such redundancies).

Apart from missing some records that have overlapping or identical semantics, or retrieving records with different semantics, there is the question of how potentially relevant tables should be located. As discussed above, especially for large, complex database systems, it can be difficult for any particular user to be fully aware of the entire database schema. Technical users may have a better understanding of the technical nature of the database, but may lack insights into the meaning, or semantic information, of the data, in order to retrieve appropriate data from the database. Similarly, non-technical users may understand what information they want, but not how to get it, including not understanding the database schema or query languages. Although it may be possible to find some semantically related tables through technical relationships, such as foreign key relationships, such a search may fail to find some related tables, as well as, as discussed above, falsely identifying tables as being semantically related simply are technically related.

FIG. 1 includes a table 140. The table 140 does not have a technical relationship with any other table in the portion of the schema 100 shown in FIG. 1. In addition, the fields 124c-124e have names that do not readily convey their meaning or purpose, or indicate whether they might have the same meaning or purpose as other fields 124 in the schema 100. For instance, field 124c may have the same semantic meaning as field 124a, field 124d may have the same meaning as field 124f, and field 124e may have the same meaning as field 124g. Thus, a search for field 124d may miss results in table 140, as it may not be known that table 140 should be searched, and, based on the different field names 126, the results in table 140 would be missed even if table 140 were included in the search.

Example 3—Example Table Elements Including Semantic Identifiers

Figure 2:
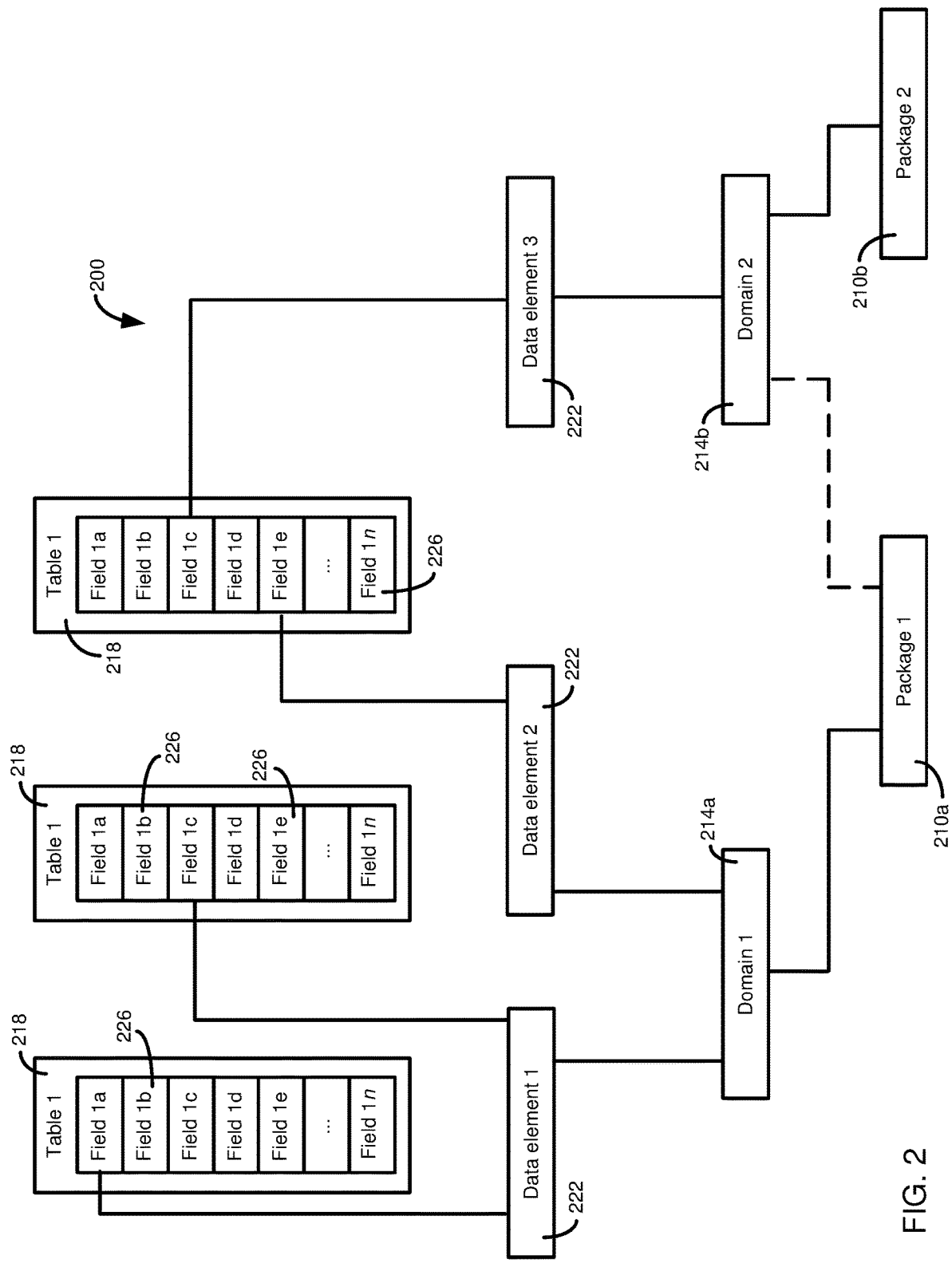
FIG. 2 is a schematic diagram illustrating relationships between table elements that can be included in a data dictionary, or otherwise used to define database tables.

FIG. 2 is a diagram illustrating elements of a database schema 200 and how they can be interrelated. In at least some cases, the database schema 200 can be maintained other than at the database layer of a database system. That is, for example, the database schema 200 can be independent of the underlying database, including a schema used for the underlying database. Typically, the database schema 200 is mapped to a schema of the database layer (e.g., schema 100 of FIG. 1), such that records, or portions thereof (e.g., particular values of particular fields) can be retrieved through the database schema 200.

The database schema 200 can include one or more packages 210. A package 210 can represent an organizational component used to categorize or classify other elements of the schema 200. For example, the package 210 can be replicated or deployed to various database systems. The package 210 can also be used to enforce security restrictions, such as by restricting access of particular users or particular applications to particular schema elements.

A package 210 can be associated with one or more domains 214 (i.e., a particular type of semantic identifier or semantic information). In turn, a domain 214 can be associated with one or more packages 210. For instance, domain 1, 214a, is associated only with package 210a, while domain 2, 214b, is associated with package 210a and package 210b. In at least some cases, a domain 214 can specify which packages 210 may use the domain. For instance, it may be that a domain 214 associated with materials used in a manufacturing process can be used by a process-control application, but not by a human resources application.

In at least some implementations, although multiple packages 210 can access a domain 214 (and database objects that incorporate the domain), a domain (and optionally other database objects, such as tables 218, data elements 222, and fields 226, described in more detail below) is primarily assigned to one package. Assigning a domain 214, and other database objects, to a unique package can help create logical (or semantic) relationships between database objects. In FIG. 1, an assignment of a domain 214 to a package 210 is shown as a solid line, while an access permission is shown as a dashed line. So, domain 214a is assigned to package 210a, and domain 214b is assigned to package 210b. Package 210a can access domain 214b, but package 210b cannot access domain 214a.

Note that at least certain database objects, such as tables 218, can include database objects that are associated with multiple packages. For example, a table 218, Table 1, may be assigned to package A, and have fields that are assigned to package A, package B, and package C. The use of fields assigned to packages A, B, and C in Table 1 creates a semantic relationship between package A and packages B and C, which semantic relationship can be further explained if the fields are associated with particular domains 214 (that is, the domains can provide further semantic context for database objects that are associated with an object of another package, rather than being assigned to a common package).

As will be explained in more detail, a domain 214 can represent the most granular unit from which database tables 218 or other schema elements or objects can be constructed.

For instance, a domain 214 may at least be associated with a datatype. Each domain 214 is associated with a unique name or identifier, and is typically associated with a description, such as a human readable textual description (or an identifier than can be correlated with a human readable textual description) providing the semantic meaning of the domain. For instance, one domain 214 can be an integer value representing a phone number, while another domain can be an integer value representing a part number, while yet another integer domain may represent a social security number. The domain 214 thus can held provide common and consistent use (e.g., semantic meaning) across the schema 200. That is, for example, whenever a domain representing a social security number is used, the corresponding fields can be recognized as having this meaning even if the fields or data elements have different identifiers or other characteristics for different tables.

The schema 200 can include one or more data elements 222. Each data element 222 is typically associated with a single domain 214. However, multiple data elements 222 can be associated with a particular domain 214. Although not shown, multiple elements of a table 218 can be associated with the same data element 222, or can be associated with different data elements having the same domain 214. Data elements 222 can serve, among other things, to allow a domain 214 to be customized for a particular table 218. Thus, the data elements 222 can provide additional semantic information for an element of a table 218.

Tables 218 include one or more fields 226, at least a portion of which are mapped to data elements 222. The fields 226 can be mapped to a schema of a database layer, or the tables 218 can be mapped to a database layer in another manner. In any case, in some embodiments, the fields 226 are mapped to a database layer in some manner Or, a database schema can include semantic information equivalent to elements of the schema 200, including the domains 214.

In some embodiments, one or more of the fields 226 are not mapped to a domain 214. For example, the fields 226 can be associated with primitive data components (e.g., primitive datatypes, such as integers, strings, Boolean values, character arrays, etc.), where the primitive data components do not include semantic information. Or, a database system can include one or more tables 218 that do not include any fields 226 that are associated with a domain 214. However, the disclosed technologies include a schema 200 (which can be separate from, or incorporated into, a database schema) that includes a plurality of tables 218 having at least one field 226 that is associated with a domain 214, directly or through a data element 222.

Figure 3:
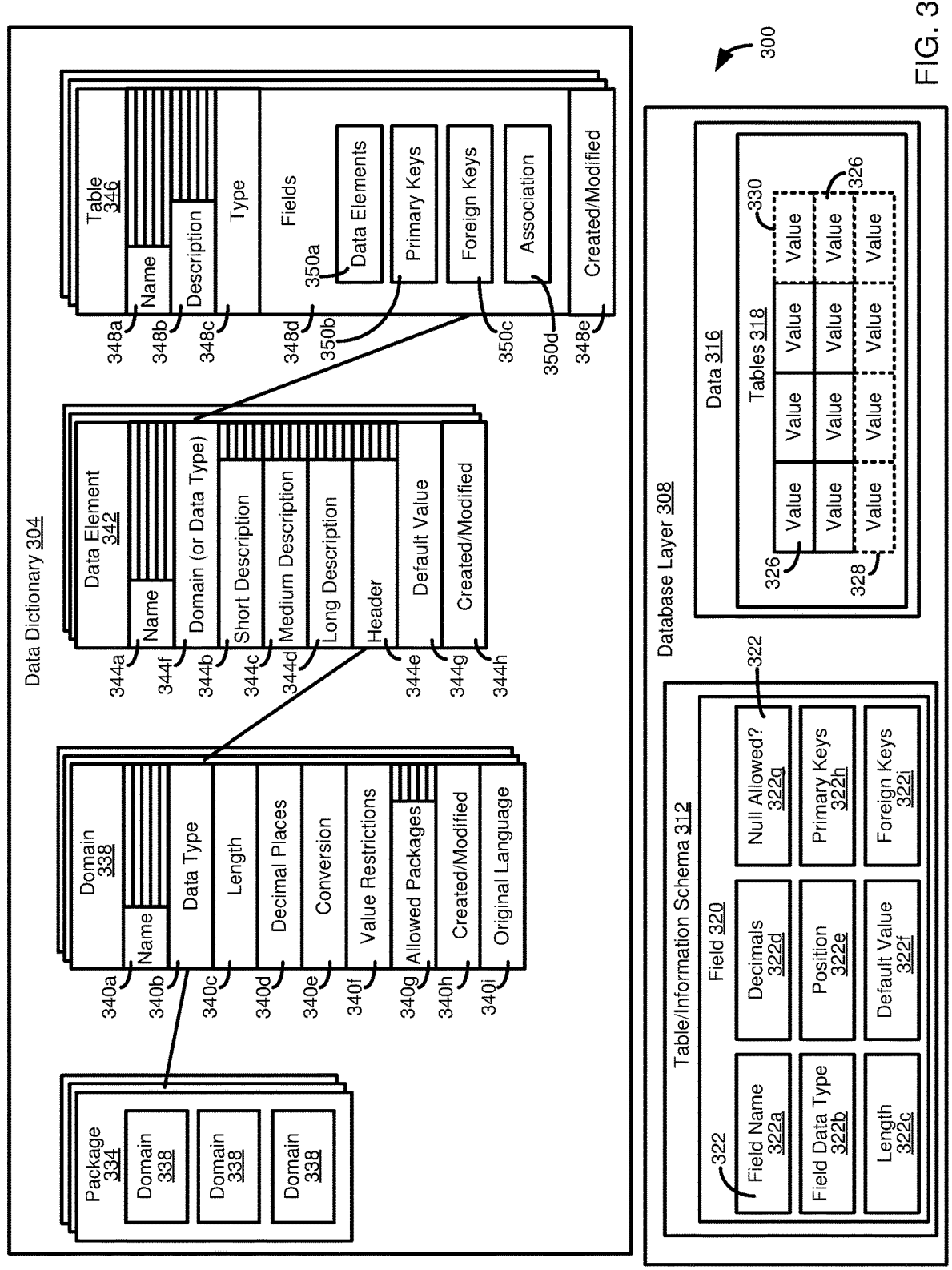
FIG. 3 a schematic diagram illustrating components of a data dictionary and components of a database layer.

In addition, the disclosed technologies can identify and search, or search, fields 226 that are not mapped to a domain 214, including by searching values of the field (e.g., values of individual tuples) that match a query parameter, or by searching metadata associated with the field (e.g., as described with respect to FIG. 3, the field may still have descriptive text that can be searched for query parameters, or used to identify semantic relationships, or by considering semantic information other than domain information, such as considering a package 210 to which the field is assigned, other objects in such package, and other packages which may use the field).

Example 4—Example Data Dictionary Components

Schema information, such as information associated with the schema 200 of FIG. 2, can be stored in a repository, such as a data dictionary. As discussed, in at least some cases the data dictionary is independent of, but mapped to, an underlying relational database. Such independence can allow the same database schema 200 to be mapped to different underlying databases (e.g., databases using software from different vendors, or different software versions or products from the same vendor). The data dictionary can be persisted, such as being maintained in a stored tables, and can be maintained in memory, either in whole or part. An in-memory version of a data dictionary can be referred to as a dictionary buffer.

FIG. 3 illustrates a database environment 300 having a data dictionary 304 that can access, such as through a mapping, a database layer 308. The database layer 308 can include a schema 312 (e.g., an INFORMATION_SCHEMA as in PostgreSQL) and data 316, such as data associated with tables 318. The schema 312 includes various technical data items/components 322, which can be associated with a field 320, such as a field name 322a (which may or may not correspond to a readily human-understandable description of the purpose of the field, or otherwise explicitly describe the semantic meaning of values for that field), a field data type 322b (e.g., integer, varchar, string, Boolean), a length 322c (e.g., the size of a number, the length of a string, etc., allowed for values in the field), a number of decimal places 322d (optionally, for suitable datatypes, such as, for a float with length 6, specifying whether the values represent XX.XXXX or XXX.XXX), a position 322e (e.g., a position in the table where the field should be displayed, such as being the first displayed field, the second displayed field, etc.), optionally, a default value 322f (e.g., "NULL," "0," or some other value), a NULL flag 322g indicating whether NULL values are allowed for the field, a primary key flag 322h indicating whether the field is, or is used in, a primary key for the table, and a foreign key element 322i, which can indicate whether the field 320 is associated with a primary key of another table, and, optionally, an identifier of the table/field referenced by the foreign key element. A particular schema 312 can include more, fewer, or different technical data items 322 than shown in FIG. 3.

The tables 318 are associated with one or more values 326. The values 326 are typically associated with a field 320 defined using one or more of the technical data elements 322. That is, each row 328 typically represents a unique tuple or record, and each column 330 is typically associated with a definition of a particular field 320. A table 318 typically is defined as a collection of the fields 320, and is given a unique identifier.

The data dictionary 304 includes one or more packages 334, one or more domains 338, one or more data elements 342, and one or more tables 346, which can at least generally correspond to the similarly titled components 210, 214, 222, 218, respectively, of FIG. 2. As explained in the discussion of FIG. 2, a package 334 includes one or more (typically a plurality) of domains 338. Each domain 338 is defined by a plurality of domain elements 340. The domain elements 340 can include one or more names 340a. The names 340a serve to identify, in some cases uniquely, a particular domain 338. A domain 338 includes at least one unique name 340a, and may include one or more names that may or may not be unique. Names which may or may not be unique can include versions of a name, or a description, of the domain 338 at various lengths or levels of detail. For instance, names 340a can include text that can be used as a label for the domain 338, and can include short, medium, and long versions, as well as text that can be specified as a heading. Or, the names 340a can include a primary name or identifier and a short description or field label that provides human understandable semantics for the domain 338.

In at least some cases, the data dictionary 304 can store at least a portion of the names 340a in multiple language, such as having domain labels available for multiple languages. In embodiments of the disclosed technologies, when domain information is used for identifying relationships between tables or other database elements or objects, including searching for particular values, information, such as names 340a, in multiple languages can be searched. For instance, if "customer" is specified, the German and French portion of the names 340a can be searched as well as an English version.

The domain elements 340 can also include information that is at least similar to information that can be included in the schema 312. For example, the domain elements 340 can include a data type 340b, a length 340c, and a number of decimal places 340d associated with relevant data types, which can correspond to the technical data elements 322b, 322c, 322d, respectively. The domain elements 340 can include conversion information 340e. The conversion information 340e can be used to convert (or interconvert) values entered for the domain 338 (including, optionally, as modified by a data element 342). For instance, conversion information 340 can specify that a number having the form XXXXXXXXX should be converted to XXX-XX-XXXX, or that a number should have decimals or comma separating various groups of numbers (e.g., formatting 1234567 as 1,234,567.00). In some cases, field conversion information for multiple domains 338 can be stored in a repository, such as a field catalog.

The domain elements 340 can include one or more value restrictions 340f. A value restriction 340f can specify, for example, that negative values are or are not allowed, or particular ranges or threshold of values that are acceptable for a domain 338. In some cases, an error message or similar indication can be provided as a value is attempted to be used with a domain 338 that does not comply with a value restriction 340f. A domain element 340g can specify one or more packages 334 that are allowed to use the domain 338.

A domain element 340h can specify metadata that records creation or modification events associated with a domain element 338. For instance, the domain element 340h can record the identity of a user or application that last modified the domain element 340h, and a time that the modification occurred. In some cases, the domain element 340h stores a larger history, including a complete history, of creation and modification of a domain 338.

A domain element 340i can specify an original language associated with a domain 338, including the names 340a. The domain element 340i can be useful, for example, when it is to be determined whether the names 340a should be converted to another language, or how such conversion should be accomplished.

Data elements 342 can include data element fields 344, at least some of which can be at least generally similar to domain elements 340. For example, a data element field 344a can correspond to at least a portion of the name domain element 340a, such as being (or including) a unique identifier of a particular data element 342. The field label information described with respect to the name domain element 340a is shown as separated into a short description label 344b, a medium description label 344c, a long description label 344d, and a header description 344e. As described for the name domain element 340a, the labels and header 344b-344e can be maintained in one language or in multiple languages.

A data element field 344f can specify a domain 338 that is used with the data element 342, thus incorporating the features of the domain elements 340 into the data element. Data element field 344g can represent a default value for the data element 342, and can be at least analogous to the default value 322f of the schema 312. A created/modified data element field 344h can be at least generally similar to the domain element 340h.

Tables 346 can include one or more table elements 348. At least a portion of the table elements 348 can be at least similar to domain elements 340, such as table element 348a being at least generally similar to domain element 340a, or data element field 344a. A description table element 348b can be analogous to the description and header labels described in conjunction with the domain element 340a, or the labels and header data element fields 344b-344e. A table 346 can be associated with a type using table element 348c. Example table types include transparent tables, cluster tables, and pooled tables, such as used as in database products available from SAP SE of Walldorf, Germany.

Tables 346 can include one or more field table elements 348d. A field table element 348d can define a particular field of a particular database table. Each field table element 348d can include an identifier 350a of a particular data element 342 used for the field. Identifiers 350b-350d, can specify whether the field is, or is part of, a primary key for the table (identifier 350b), or has a relationship with one or more fields of another database table, such as being a foreign key (identifier 350c) or an association (identifier 350d).

A created/modified table element 348e can be at least generally similar to the domain element 340h.

Example 5—Example Tables Having Semantic Relationships

Figure 4:
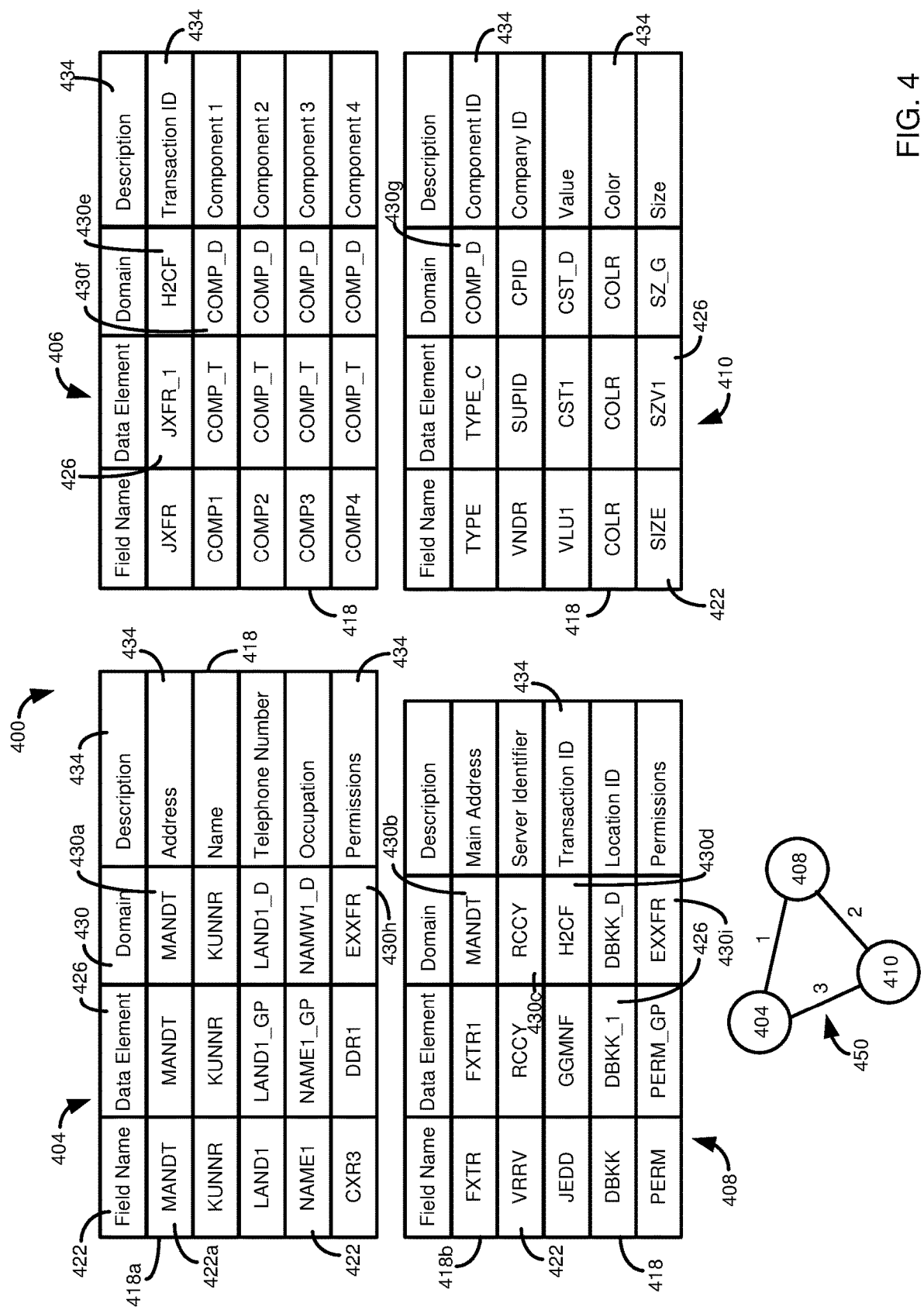
FIG. 4 is a diagram of a database schema illustrating semantic relationships between tables, and a graph illustrating how database tables can be directly or indirectly semantically related to one another.

FIG. 4 illustrates a database schema 400 (which can be a portion of a larger database schema) that demonstrates how a plurality of tables 404, 406, 408, 410 can be related by semantic information (e.g., metadata), such as a domain (or, in other aspects, a data element). For the present discussion, it will be assumed that the tables 404, 406, 408, 410 are not technically related. That is, it is assumed that the tables 404, 406, 408, 410 do not include a foreign key or similar relationship (e.g., an association with a non-primary key field) with another table. However, in other aspects, one or all of the tables 404, 406, 408, 410 includes a technical relationship (via technical information) with another table.

Each table 404, 406, 408, 410 includes a plurality of attributes or fields 418, which can correspond to a column of a table. Individual table records can be represented by tuples having values for such attributes 418. Each attribute 418 can be associated with a name 422, a data element 426, a domain 430, and a description 434. Although attributes 418 and associated information are shown as collected for individual tables 404, 406, 408, 410, in other aspects, data for multiple tables can be collected in a common repository, such as a single table having the format, or a format similar to (e.g., optionally with additional, fewer, or different types of information) as one of the tables shown. Such a common repository can represent a data dictionary or similar structure, such as a dictionary buffer (e.g., an in-memory representation of a data dictionary that may reside/be maintained in persistent storage).

As will be described, disclosed technologies allow for one or more source tables to be provided, or otherwise used, to define a set of semantically related tables. This definition can occur recursively. That is, tables related to a starting table can be identified to provide a first group, or hierarchical level, of related tables. The tables in the first group can then be analyzed for related tables, to provide a second group, or hierarchical level. This process can continue for all fields 418 in a particular table at a particular level. In some cases, the process can continue until all fields of all semantically related tables have been analyzed. In other cases, a limit can be specified for how long the process should be carried out. The limit can be a running time, a total number of tables identified, a total number of records associated with identified tables, a total number of records with values matching a query, a number of hierarchical levels, other criteria, or a combination thereof.

Taking table 404 as a starting point (such as a search for a particular value for the attribute 418a with the field name 422a of "MANDT," domains 430 associated with the table 404 are identified, providing domains 430={MANDT, KUNNR, LAND1_D, NAMW1_D, EXXFR}. The remaining tables 406, 408, 410 are then analyzed for matching domains. Information associated with table 406 is retrieved and searched. However, table 406 does not have a domain 430 matching a domain of table 404.

Domains 430 associated with table 408 can be retrieved and searched. Looking first at the MANDT domain 430a of table 404, it can be seen that there is a match with domain 430b of table 408. Based on this common domain, an indication can be stored (and returned) that table 408 is related to table 404. Optionally, the nature of the relation (e.g. the MANDT domain, or particular attributes 418 or field names 422 of the relevant attributes) can be stored (and returned). Domains 430 of table 408 can be analyzed to determine related tables. Looking first at domain 430b, MANDT, it can be seen that no other table in the schema 400 has this domain.

Looking next at domain 430c, "RCCY," no other table in the schema 400 has this domain. However, looking at domain 430d, "H2CF," identifies table 406 as related to table 408, through the matching "H2CF" domain 430e. The set of related tables can thus be updated to include table 406. So, analyzing domains 430 of tables 404, 406, 408, 410 in a recursive manner can identify relationships that may be missed looking only at the domains of table 404. In some cases, a domain is not added to a set of domains to be analyzed if already present, such as to find a most direct path between a parent table and a child table. For instance, if a root table includes a domain, and the child table includes the same domain, relationships from that domain are analyzed from the parent, rather than the child. In other aspects, such domains can be analyzed from the child rather than the parent, or from both the parent and any children.

Continuing the example, the schema 400 can be analyzed to determine whether any tables have a domain 430 in common with a domain of table 408. Taking first domain 430e, "H2CF," no other tables, other than the "parent" table 408, have this domain. Taking next the domain 430f, "COMP_D," table 410 is identified as including this domain, 430g, and thus table 410 is added to the list of related tables.

The domains 430 of tables 410 are analyzed to determine matches with other tables of the schema 400. Taking first domain 430g, "COMP_D," no tables other than the "parent" table 406 have this domain. Next, taking in turn the domains "CPID," "CST_D," "COLR," and "SZ_G," it is determined that no tables match a domain of table 410. As table 410 has been fully analyzed, the processing can revert back to table 406.

It is determined that no domains 430 in table 406 remain to be analyzed, so the processing can revert back to table 408. Continuing with the domains 430 of table 408, it is determined that no tables match the domains 430 of "DBKK_D" or "EXXFR," and so the processing can revert back to table 404.

Continuing with the domains 430 of table 404, it is determined that no tables in the schema 400 match the domain "KUNNR," the domain "LAND1_D," or the domain "NAMW_D." Taking the domain 430h, "EXXFR," of table 404, it is determined that this domain matches the domain 430i of table 408. However, as table 408 has already been analyzed, it is not added to the set of related tables. That is, tables that have been analyzed (including whether or not they were added to the set of semantically related tables) can be tracked, to avoid having the analysis enter a loop.

In some cases, the set of related tables can include information regarding a degree of relationship, in which case such an indicator can be incremented by 1 (e.g., the information for the relationship between tables 404 and 408 indicates that two domains are in common, while the information for the relationship between table 408 and table 406 indicates one domain in common). In some embodiments, relationship information between tables can include an identifier for fields of tables that are linked by a common domain, which can be specified, in some cases, by referencing the corresponding field names 422. For instance, an indication can be stored that attribute 418a of table 404 is related to field 418b of table 408, including, optionally, that the relationship is through the domain 430a of "MANDT."

In some cases, the set of related tables, and information included therewith, can be used to form a graph 450, or otherwise track or use relationships between the tables 404, 406, 408, 410 in the schema 400. For instance, a table can be connected to another table directly (e.g., 404 being connected to 408 via link 1), and indirectly through one or more intermediate tables (e.g., 404 being connected to 408 via links 3 and 2). As an example, consider a scenario where the table 404 includes an attribute 418 with the domain of "COMPD." In this case, table 404 could be connected directly to tables 406, 410, or could be connected to one of table 406, 410, through the other table.

In other aspects, the analysis can proceed other than as described. For example, rather than proceeding from a parent table to a child table each time a matching domain is identified, a given table or hierarchical level can be fully analyzed before proceeding to a next table or level.

Example 6—Example Method for Identifying Tables Having a Semantic Relationship

Figure 5:
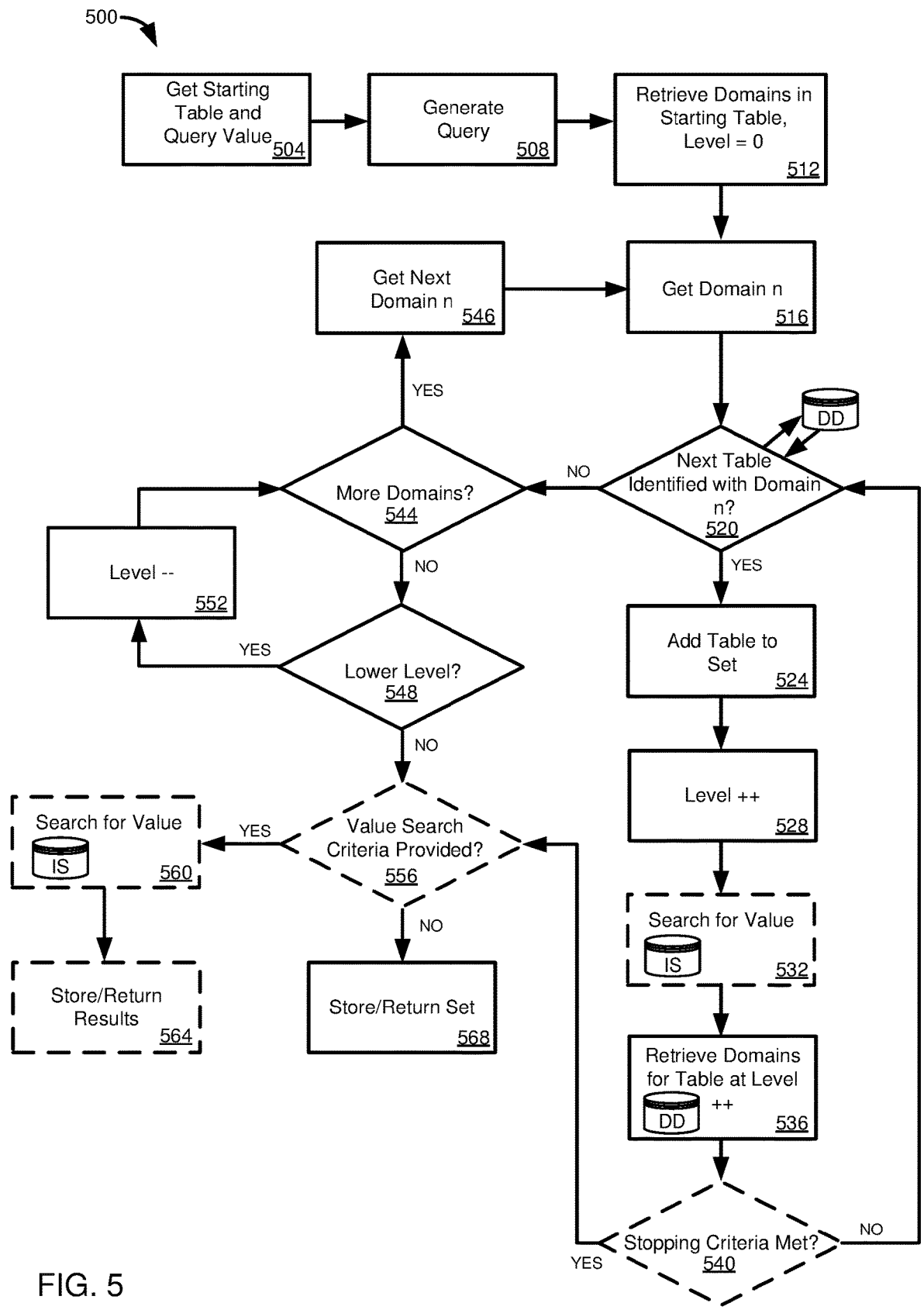
FIG. 5 is a flowchart of example operations in determining semantic relationships between tables, optionally with operations for performing a value query.

FIG. 5 illustrates a flowchart of a method 500 for identifying tables having common semantic information. The method 500 can be carried out using the database environment 300 of FIG. 3. As will be further described, the method 500 can be implemented in a variety of manners. In one aspect, the implementation differences can depend on whether it is desired to simply identify semantically related tables, or whether particular information is to be retrieved from the identified tables, such as data relating to one or more values (or a more complex query) entered by a user or provided by an application.

In the event particular values are to be analyzed and retrieved (if appropriate), in some cases, the retrieval can be carried out after the identified tables have been determined. In other cases, the retrieval can be carried out while the table relationships are being determined. When a set of semantically related tables are determined, the set of tables can optionally be stored for future use, including analysis or query. For instance, if a set of semantically related tables is initially determined without being searched for a value, the set of semantically related tables can later be searched for a value if desired. That is, a saved set of tables can be queried without re-determining table relations. Reusing a set of tables can be useful, as it can speed query processing and reduce computing resource use, particularly if it is suspected that a database schema will not change frequently.

At 504, a starting table (or portion thereof, such as a field) is received, such as from an application or end user. Optionally, 504 can including receiving a value query or another type of query that will specify values to be searched for and retrieved if found, optionally with intermediate processing (e.g., applying one or more aggregation operators).

504 can include receiving other types of parameters that can affect how semantically related tables are identified, or queried. For example, limits can be placed on how long the method will be carried out, such as time restrictions (e.g., a maximum runtime), result restrictions (e.g., a number of tables to be included in a set, a number of records to be returned or analyzed), or semantic restrictions (e.g., specifying a number of domains that must be in common between tables, or specifying one or more domains that are, or are not, to be included in relevant results or analyzed).

At 508, the information provided in 504 is used to generate one or more semantic queries, value queries, or combinations thereof. For example, a sematic query may be generated to locate semantically related tables. Queries may be in a suitable query language, such as the Structured Query Language (SQL). Queries may also be formulated in a language (such as the Advanced Business Application Programming language, or ABAP), that can include elements of a query language or which can be converted to a query language. A tool (or component or module) according to the present disclosure can include various functions or templates for forming a query to determine semantically related tables given particular input (e.g., one or more table identifiers, one or more field names, and optionally values, one or more domains, or combinations thereof).

An initial table is analyzed at 512. Analyzing the table at 512 includes retrieving domains (or other semantic identifiers) associated with the table. In a particular implementation, the domains can be retrieved from a data dictionary or similar repository (e.g., a dictionary buffer, which can represent a memory-resident version of the data dictionary). A repository that includes table information can be stored in a common repository, or multiple repositories, including having a repository, such as a table, that describes semantic information, and optionally technical information, for a particular table. When multiple repositories are present, the method 500 can iteratively search relevant repositories to determine whether tables are semantically related. For example, database tables, or a selected portion thereof, can be selectively analyzed, where, when a table is to be analyzed, its semantic information is retrieved from the appropriate repository.

When multiple tables are directly associated with the input provided at 504 (e.g., multiple table names are provided, or fields associated with multiple tables are provided), one of the tables can be selected for initial processing at 512. Other tables can be processed after the initial table is processed. Or, at least a portion of the method 500 can be parallelized, such as carrying out steps of the method starting at 512 in parallel for different tables. If multiple tables are analyzed in parallel, semantic information can be included in a common result set during processing, or separate result sets can be generated, which are typically integrated into a final result set, including removing multiple instances of a table from a set, but optionally updating the results to indicate additional connections between tables that are reflected in a second set but not in a first set into which the second set is being merged.

A domain of the starting table, n, is identified at 516. At 520, it is determined whether another table of a database, or selected portion thereof, has the domain n. 520 can involve searching domain information in a data dictionary, a dictionary buffer, or one or more other repositories that include semantic identifiers. Although described as involving a single domain, the processing at 520, and subsequent processing, can be carried out concurrently for multiple domains, in some aspects (including, if desired, domains associated with multiple starting tables).

If another table having the domain, n, is identified at 520, it is added to a set of semantically related tables at 524. The set of semantically related tables 524 can constitute results of a query for a search area. That is, the set defines tables that should be searched to obtain data (e.g., actual record values) to help ensure that all relevant, related data is analyzed or retrieved. Retrieving the record values can be carried out using a search string. In at least some cases, the search area can be determined in response to a first text string (e.g., one or more keywords defining the search area string or a query language statement) and the search string can be determined in response to a second text string (e.g., one or more keywords defining the search string or a query language statement). In other cases, a single set of one or more keywords can provide both the search area string and the search string. For example, a string of "USERID=1234" can define the starting point for the search area query (starting from the table or tables with the field name USERID) and also the search string, "1234." Where keyword are provided, a system can convert the keywords into suitable database operations (e.g., query language statements).

As explained above, the set of semantically related tables can include information in addition to the list of semantically related tables, such as which fields of a first table have a semantic relationship, such as a common domain, with particular fields of a second table. The set can also include information regarding the tables themselves, such as schema information for the tables (e.g., field names, domains, data elements, descriptions, datatypes, etc.) or information regarding a size, which can include a number of tuples or records, of the table.

The level of a hierarchical search is incremented at 528. For instance, a starting table can be considered to be the root, or zero level, of the search (which can be represented as a tree or similar structure, such as a heap). Tables having a direct semantic relationship with a root table, such as through one or more common domains, can be considered as at a first level of the hierarchy. Tables related to tables at the first level of the hierarchy can be considered to be at a second level of the hierarchy, and so on. In some instances, the method 500 proceeds to a next hierarchical level when a new table is identified. Each higher level of the hierarchy is analyzed before a lower level (i.e., closer to the root node) in the hierarchy is revisited for further analysis. In other cases, a single level of a hierarchy is fully explored before a higher level (i.e., further from the root node) of the hierarchy is analyzed. Or, multiple fields/domains for a table at a particular hierarchical level can be analyzed in parallel.

Optionally, at 532, values matching a value query (e.g., for a search string) entered at 504 can be determined. If matching values are found in the tables being analyzed, they can be added to a query result set (which is typically maintained separately from the set of semantically related tables). In some cases, determining matching values can be carried out in conjunction with a schema, such as an INFORMATION_SCHEMA, of a database layer (e.g., a relational database where actual data values are maintained). For example, a SELECT statement in a software layer above the database layer, such as a SELECT statement in the ABAP language, can be converted to a query for the database layer using information in the INFORMATION_ SCHEMA, or the INFORMATION_SCHEMA can be used to confirm that a query submitted to the database is correct (e.g., the queried tables exist and have field names matching those used in the query). Or, a mapping between tables in the data dictionary, or a similar repository, and an underlying database layer can otherwise be used to retrieve or analyze data values in the database layer. In other implementations, the database can be queried in another manner, including without consulting an INFORMATION_SCHEMA or a mapping.

Domains for the table at the incremented hierarchical level are retrieved, such as from a data dictionary or dictionary buffer, at 536. At 540, optionally, it is determined whether stopping criteria have been met, such as the hierarchy satisfying a threshold (e.g., meeting or exceeding a specified level), a threshold number of tables being identified, a threshold number of records or results being identified, a number of iterations being met or exceeded, or a specified running time or amount of resource use being met or exceeded. If the stopping criteria is met at 540, the method 500 can proceed to 556, as further described. If the stopping criteria are not met at 540, the method 500 can return to 520, where it is determined whether there are tables (other than the parent table) having a semantic relationship with the current table. If so, the method 500 can proceed to a next hierarchical level, as described at 524 et seq. Although the stopping criteria check is shown, and has been described, as occurring after 536, it should be appreciated that the stopping criteria check can be included at alternative, or additional, points in the method 500, such as prior to 520, subsequent to 520, subsequent to 532, or at other points.

If, at 520, no tables are found having the domain currently being analyzed (at the table/hierarchical level currently being analyzed), the method 500 processes to 544, where it is determined whether the current table/hierarchical level includes additional domains to be analyzed. If additional domains are available to be analyzed, the next domain is set as the domain currently being analyzed at 546 and the method 500 returns to 520. If additional domains are not available at 544, the method 500 proceeds to 548 where it is determined whether lower hierarchical levels remain to be analyzed. If lower hierarchical levels are not available, the method 500 proceeds to 556, as will be further described. For example, if the method 500 is at the root node, and no more domains are to be analyzed at the root node (and no other tables exist to be analyzed at the root level, in the case where multiple starting tables were provided or otherwise identified), the method 500 proceeds to 556. If lower levels exist, the method 500 decrements the level currently being analyzed at 552, such as returning to a table previously being analyzed before it transitioned to the current table. The method 500 then proceeds to 544 to determine whether additional domains are available to be processed at the, now decremented, hierarchical level/current table.

If no additional domains or levels are available at 544, 548, the method 500 determines, optionally, at 556 if search criteria (e.g., a value query or a search string) were provided, such as at 504. If value search criteria were provided, the set of identified tables can be queried for the value (or other query operations performed) at 560, such as using an information schema. Query results can be stored or returned at 564. Returning query results can include sending query results from a database system to a requesting application, such as an application on a client device. The response can be a return value to an API call made by the application. Returned results can be presented to a user, such as in a display, as well as being rendered in various file formats, including PDF or XML. The results, including in file form, can then be printed, emailed, mailed via a physical mail service, and the like.

As explained above, in some cases a set of semantically related tables can be identified and later searched for particular values. In such cases, 504 can involve receiving an identifier of the set of semantically related tables and the method 500 can proceed from 504 to 560.

If, at 556, it is determined that value search criteria were not provided, or if 556 was not included, the method 500 proceeds to 568, where the set of related tables can be stored or returned. In particular examples, 568 can include displaying information relating to set of tables, such as a display showing the hierarchical relationships between tables, including between particular domains between pairs of tables. 568 can also include storing a representation of hierarchical table relationships, including in a file form (such as PDF or a XML representation), while can then be printed, emailed, or otherwise viewed or disseminated. In some cases, returning a set of related tables can include providing a response to an API call made by a calling application. An example display of table relationships is shown in FIG. 6, described in Example 7, below.

Example 7—Example Visualization of Semantic Table Relationships

Figure 6:
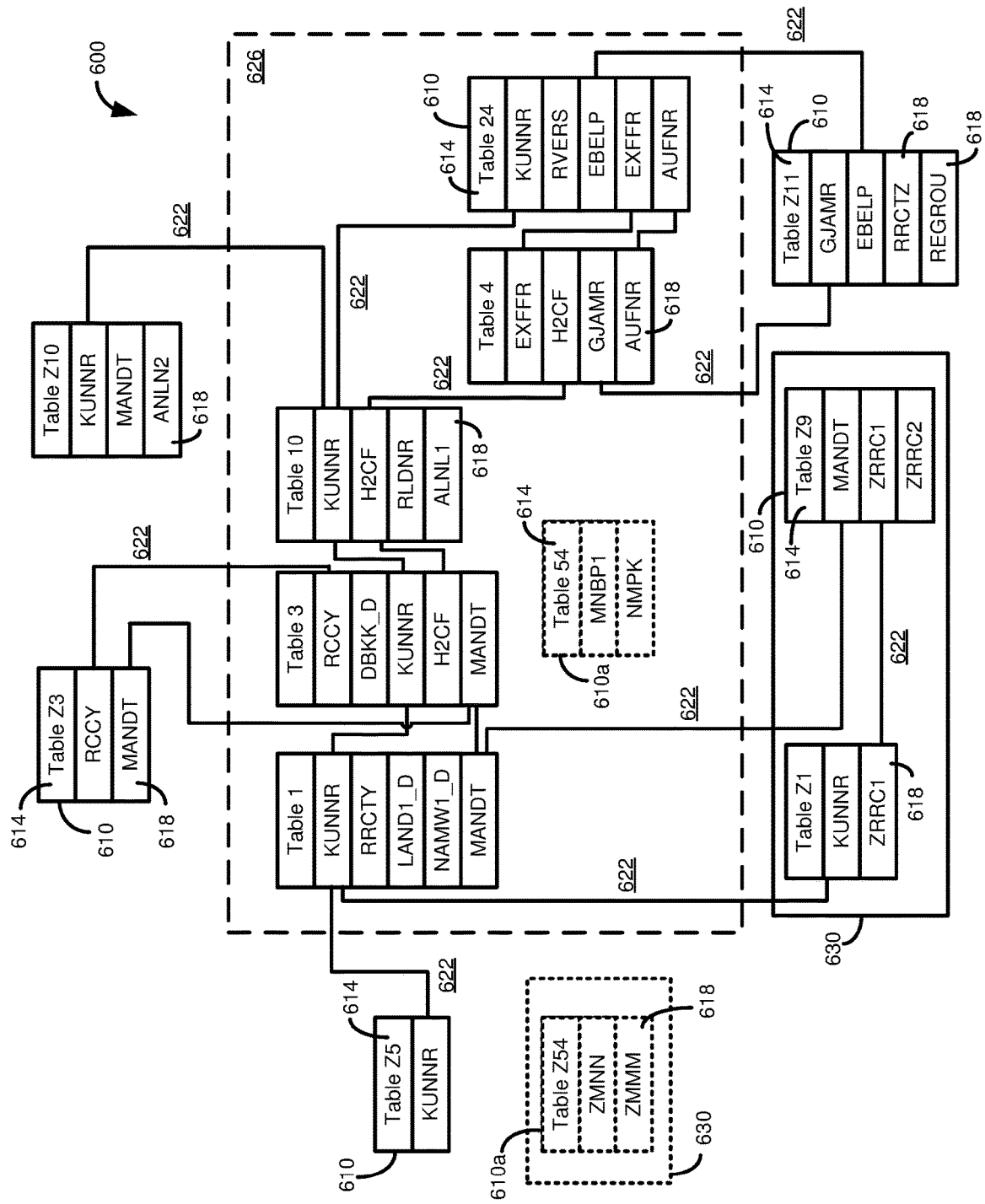
FIG. 6 is a schematic diagram illustrating an example visualization or display of semantic relationships between database tables.

FIG. 6 presents a graphical view 600 that illustrates semantic relationships between a plurality of database tables. The view 600 can be a result produced by performing the method 500 of FIG. 5. In one implementation, the view 600 can be rendered for display to a user by a software application. The view 600 can be used for various purposes, including to determine, at least in part, how data should be partitioned. That is, to improve query processing, tables in the view 600 can be included in a single partition. In some cases, a database can automatically be partitioned to conform with the view 600, while in other cases such a partition can be manually carried out, including with reference to the view. Thus, disclosed technologies can result in improved database performance, including faster query processing and less resource use (e.g., memory, network, and processor).

The table names, and their relationships, can also be used to determine access permissions (e.g., a particular user may need to be provided with access to certain related tables to carry out a task, but should not be permitted to access other tables), thus improving data security and data privacy. The view 600 can be used for data analysis, by understanding the flow or relationship of data. For instance, a list of tables, without an indication of relationships, may not explain how data in one table explains or is otherwise associated with data in another table. Understanding a table structure can also facilitate the development of applications that use the tables, as well as facilitate enhancements or modifications to table design, thus speeding software design and development, and making it more efficient.

The graphical view 600 includes semantic information for a plurality of tables 610. Each table 610 can be identified by an identifier 614, which can be a human readable name or abbreviation, or, if different, an identifier that can be used to reference or access the table. The view 600 also lists domains 618 associated with each table 610. Links 622 show relationships between domains of different tables.

One benefit that can be realized using the disclosed technologies is determining semantic relationships, and optionally performing value queries, in a dynamic manner That is, tables 610 within the box 626 can be considered "standard" tables, such as tables that might be provided by a software vendor, such as being part of a standard software configuration. Other tables 610, those outside the box 626, can represent custom tables, which can be tables that are useable with the standard tables but are typically specific to a particular user/entity. Because the tables outside the box 626 are nonstandard, they may be subject to more variation, and may be changed more frequently (and possibly with changes not being known other than by the entity, such as not being known by a software vendor providing the standard tables). The dynamic nature of the disclosed technologies can facilitate identifying semantic relations within a set of standard tables, within a set of custom tables, and between sets of standard tables and custom tables. Custom tables may be associated with particular applications or application modules 630.

As shown in the graphical view 600, some tables 610 can be semantically related to a single table, while other tables can be semantically related to multiple tables. Similarly, some tables may have a single domain that relates it to another table, while other tables may have one or more domains that are related to one or more other tables. Typically, the graphical view 600 does not include tables that are not semantically related to other tables (or, at least other tables shown in the graphical view 600). However, if desired, the graphical view can include one or more tables 610*a*, which are not semantically related to other tables 610. Such non-semantically related tables 610*a* can be standard tables (e.g., inside the box 626) or custom tables.

Example 8—Example One-Many Semantic Relationship Between Tables

Figure 7:
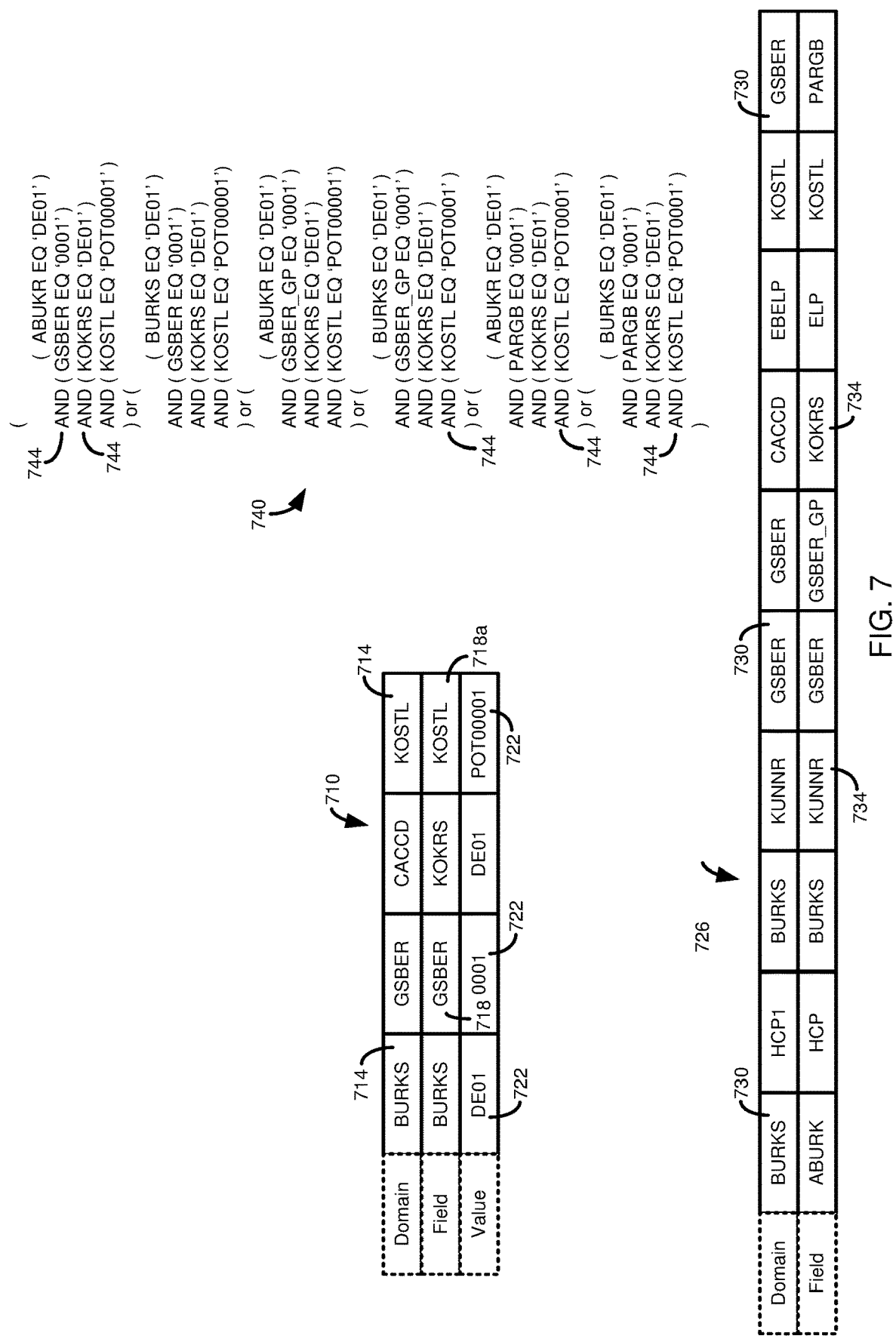
FIG. 7 is a diagram of a portion of a database schema illustrating how a second table may have multiple semantic identifiers matching a semantic identifier of a first table, and illustrating query operations for retrieving values from the second table.

FIG. 7 illustrates how values from a parent table (e.g., closer to the root of a hierarchy) can be used when searching for values in a child table. FIG. 7 illustrates a first table 710 that includes domains 714, fields 718 using a respective domain, and values 722 associated with a respective field. FIG. 7 illustrates a second table 726 that includes domains 730 and fields 734 associated with a respective domain. The second table 726 can include values, not shown, associated with respective fields 734.

When values are to be retrieved or analyzed with respect to semantically related tables, values associated with query parameters can be used to determine values that can be used to search a semantically related table. For example, assume a user has chosen to search for information relating to field 718*a* of the first table 710, and in particular wants to retrieve information with "KOSTL=POT00001." In some cases, KOSTL may be a primary key of the first table 710. Further assume that a third table, not shown, includes a field with the domain GSBER, but does not include a field with the domain KOSTL.

Disclosed technologies will identify the third table as semantically related to the first table 710 based at least on that both tables include the GSBER domain. From the first table 710, it can be determined that when KOSTL is "POT00001," GSBER has a value of "0001." Thus, relevant values from the third table can be selected, optionally along with other criteria, as those having a value for the field with the domain of GSBER of "0001."

In some cases, a parent table may have multiple occurrences of the same domain, or a child table can have multiple occurrences of the same domain. For instance, the first table 710 includes four domains 714 (which may or may not be associated with multiple fields), and the second table 726 includes seven domains 730 which correspond to those four fields. That is, the second table 726 includes multiple instances of the domain 730 "BURKS" and the domain "GSBER." In at least some cases, when a query is formulated, the query takes into account that a relevant value may be in any four-member subset of the seven fields.

In the particular example of FIG. 7, a WHERE clause, or other query language operator or command, can include a clause 740 having conditions 744. The conditions 744 represent the single-occurrence domains 730 "KOKRS" and "KOSTL" with the various permutations of the fields 734 associated with the multiple "BURKS" and "GSBER" domains. Thus, the clause 740 can be used to select tuples where any value having a field 734 associated with a domain 730 matches a domain 710 and its associated value 722.

Example 9—Example Implementation

FIGS. 8A-8F illustrate example ABAP code that provides a particular implementation of disclosed technologies. FIG. 8A provides code that retrieves semantic (and optionally technical) information for one or more given tables, such as retrieving such information from a data dictionary or dictionary buffer. The code in FIG. 8B includes IT_SEL_TAB, which contains the field names which are to be searched. LT_DFIES includes the domain name for every field name (e.g., can be used to find a domain associated with a given field). In this implementation, each domain is searched separately. RRI_GET_DDFTX_FROM_DOMNAME searches for all tables containing a particular domain in LT_DFIES.

The code in FIG. 8C performs operations or searching the dictionary buffer, DDFTX, for tables that contain the domain current being searched, P_DOMNAME of the current loop (specified in FIG. 8B). Relevant tables are stored in LT_TABLES. As set forth in the code in FIG. 8D, a domain in one table that matches the domain being searched results in a counter, ENTITY_NR, being incremented to reflect how many "hits" a table has. In the FIG. 8D code, a domain that matches search criteria is referred to as an entity. Field names associated with entities (e.g., matching domains), and optionally other fields (e.g., as long as one domain matches, all fields in the table are retrieved), are retrieved. Retrieving the field names can be used to formulate queries to retrieve or analyze values in the respective tables (e.g., to perform a value query).

With additional reference to FIG. 8E, LT_SELFIELDS stores fields associated with matching domains. LT_OR_SELFIELDS includes query operations (e.g., a WHERE statement) that can be used to select values (or perform other query operations) on the underlying database tables associated with matching domains. The code in FIGS. 8B-8E is a recursive loop that determines hierarchical semantic relationships between tables, at different hierarchical levels or depths.

As shown in FIG. 8F, if newly identified tables have dependencies (e.g., additional tables related via a domain), the "det_dep_tables_iteration" function (or procedure) is called to analyze such tables. When calling the function, ET_TABLES_NEW includes tables to be analyzed at this next level of the hierarchy. ET_TABLES is a table that collects information about all relevant tables in the set, at all hierarchical levels. ET_TABLES can include a number of hits for each table, fields corresponding to matching domains, and other information.

Example 10—Example Operations for Identifying Semantically Related Tables

Figure 9:
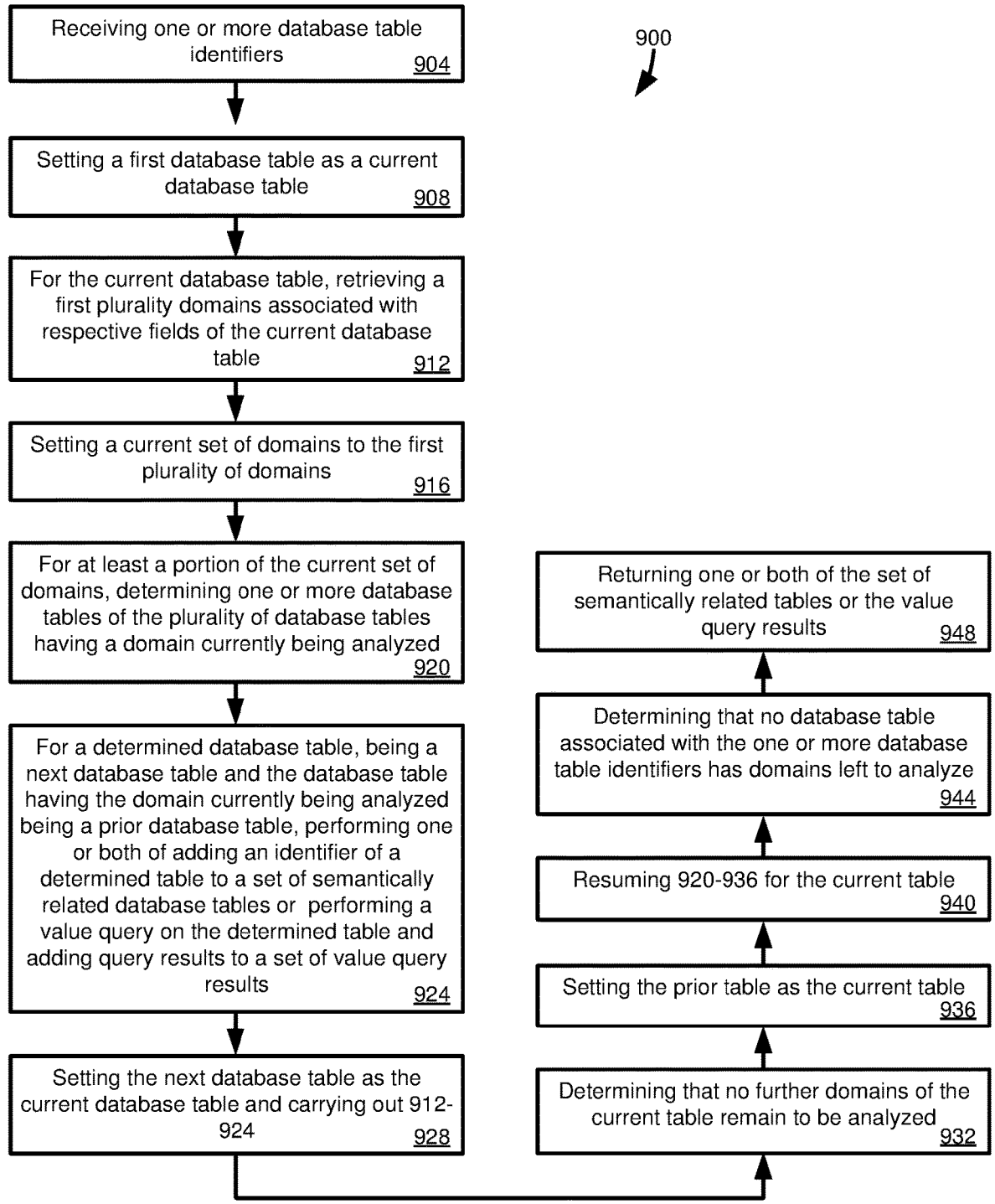
FIGS. 9-11 are flowcharts illustrating various embodiments of disclosed innovations, which embodiments include operations for identifying semantic relationships between database tables.

FIG. 9 is a flowchart of example operations 900 that can be carried out to identify semantically related tables. In particular implementations, the operations can be carried out in the database environment 300 of FIG. 3.

At 904 one or more database table identifiers are received, such as from a user through a user interface. For a first database table of a plurality of database tables, at 908, the first database table is set as a current database table. The first database table is associated with a first database table identifier of the one or more database table identifiers.

First analysis operations are carried out for the current database table. The first analysis operations include, at 912, retrieving a first plurality of domains, the first plurality of domains being associated with respective fields of the current database table. At 916, the first analysis operations include setting a current set of domains to the first plurality of domains. The first analysis operations further include, for at least a portion of the current set of domains, carrying out second analysis operations. The second analysis operations include, at 920, determining one or more other database tables of the plurality of database tables having a domain currently being analyzed. The second analysis operations include, for a determined database table, the determined database table being a next database table and the database table having the domain currently being analyzed being a prior database table, carrying out third analysis operations.

The third database operations include, at 924, one or both of adding an identifier of a determined table to a set of semantically related database tables or performing a value query on the determined table and adding query results to a set of value query results. At 928, the next database table is set as the current database table and the first analysis operations are carried out for the current database table.

It is determined at 932 that no further domains of the current table remain to be analyzed. The prior table is set as the current table at 936. At 940, the first analysis operations are resumed for the current table. It is determined at 944 that no database table associated with the one or more database table identifiers has domains left to be analyzed. One or both of the set of semantically related tables or the value query results are returned at 948.

Figure 10:
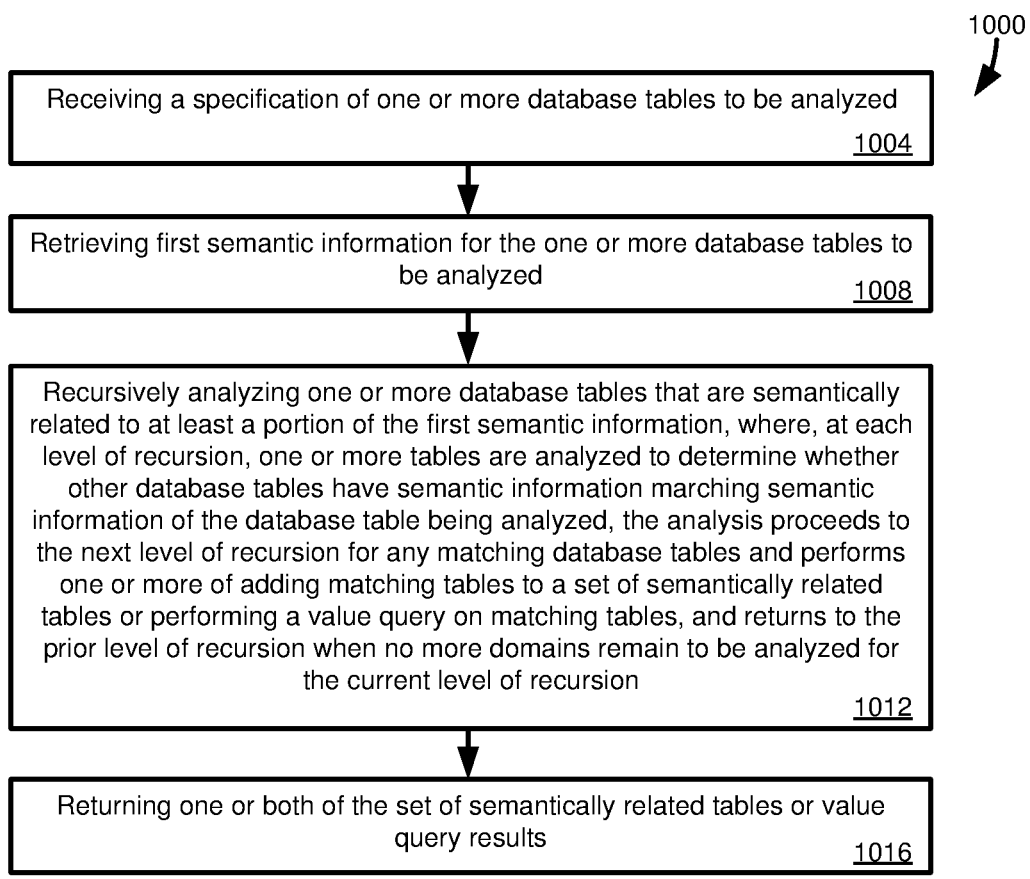

FIG. 10 is a flowchart of an additional implementation of example operations 1000 that can be carried out to identify semantically related tables. In particular implementations, the operations can be carried out using the database environment 300 of FIG. 3.

At 1004, a specification of one or more database table to be analyzed is received. First semantic information for the one or more database tables to be analyzed is retrieved at 1008. At 1012, one or more database tables that are semantically related to at least a portion of the first semantic information are recursively analyzed. At each level of recursion, one or more tables are analyzed to determine whether other database tables have semantic information matching semantic information of the database table being analyzed, the analysis proceeding to the next level of recursion for any matching database tables and performing one or more of adding matching tables to a set of semantically related tables or performing a value query on matching tables, and returning to the prior level of recursion when no more domains remain to be analyzed for the current level of recursion. One or both of the set of semantically related tables or value query results are returned at 1016.

Figure 11:
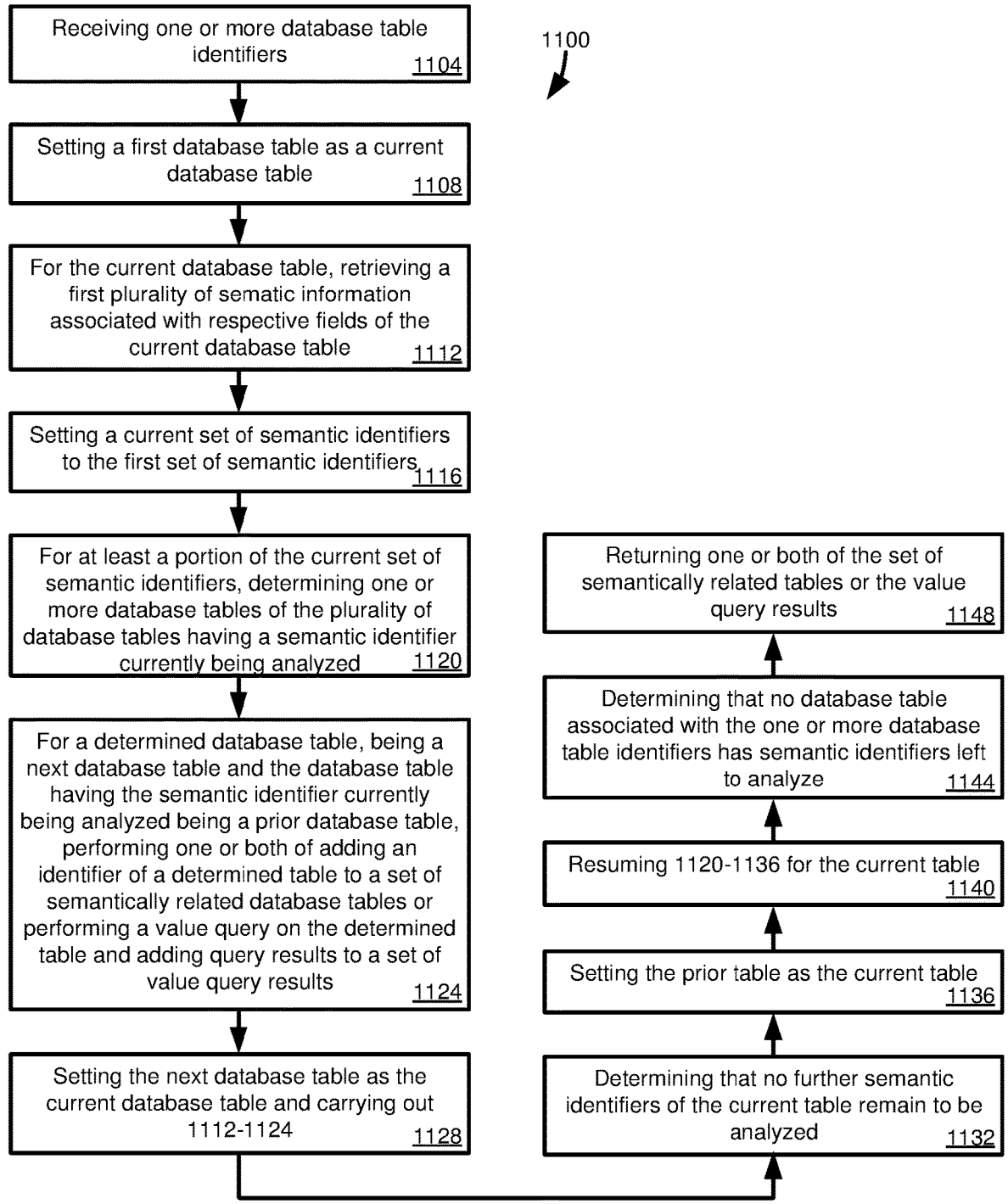

FIG. 11 is a flowchart of another implementation of example operations 1100 that can be carried out to identify semantically related tables. In particular implementations, the operations can be carried out in the database environment 300 of FIG. 3.

At 1104 one or more database table identifiers are received, such as from a user through a user interface. For a first database table of a plurality of database tables, at 1108, the first database table is set as a current database table. The first database table is associated with a first database table identifier of the one or more database table identifiers.

First analysis operations are carried out for the current database table. The first analysis operations include, at 1112, retrieving a first plurality of semantic identifiers, the first plurality of semantic identifiers being associated with respective fields of the current database table. At 1116, the first analysis operations include setting a current set of semantic identifiers to the first plurality of semantic identifiers.

The first analysis operations further include, for at least a portion of the current set of semantic identifiers, carrying out second analysis operations. The second analysis operations include, at 1120, determining one or more other database tables of the plurality of database tables having a semantic identifier currently being analyzed. The second analysis operations include, for a determined database table, the determined database table being a next database table and the database table having the semantic identifier currently being analyzed being a prior database table, carrying out third analysis operations.

The third database operations include, at 1124, one or both of adding an identifier of a determined table to a set of semantically related database tables or performing a value query on the determined table and adding query results to a set of value query results. At 1128, the next database table is set as the current database table and the first analysis operations are carried out for the current database table.

It is determined at 1132 that no further semantic identifiers of the current table remain to be analyzed. The prior table is set as the current table at 1136. At 1140, the first analysis operations are resumed for the current table. It is determined at 1144 that no database table associated with the one or more database table identifiers has semantic identifiers left to be analyzed. One or both of the set of semantically related tables or the value query results are returned at 1148.

Example 11—Computing Systems

Figure 12:
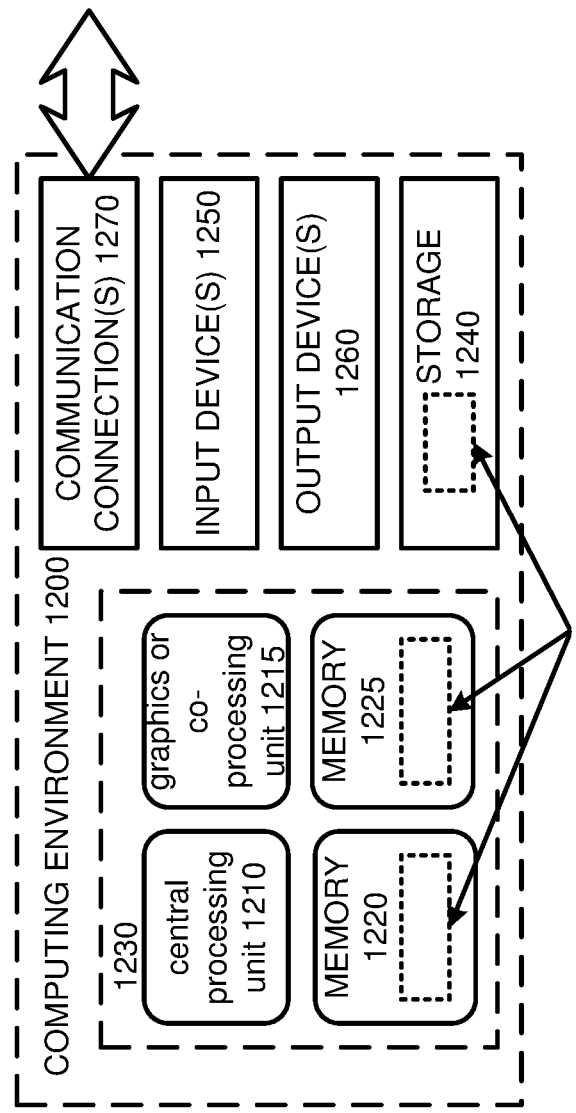
FIG. 12 is a diagram of an example computing system in which some described embodiments can be implemented.

FIG. 12 depicts a generalized example of a suitable computing system 1200 in which the described innovations may be implemented. The computing system 1200 is not intended to suggest any limitation as to scope of use or functionality of the present disclosure, as the innovations may be implemented in diverse general-purpose or special-purpose computing systems.

With reference to FIG. 12, the computing system 1200 includes one or more processing units 1210, 1215 and memory 1220, 1225. In FIG. 12, this basic configuration 1230 is included within a dashed line. The processing units

1210, 1215 execute computer-executable instructions, such as for implementing components of the architecture 300 of FIG. 3, including as described in Examples 1-10. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), non-volatile memory (e.g., ROM, EEPROM, flash memory, etc.), or some combination of the two, accessible by the processing unit(s) 1210, 1215. The memory 1220, 1225 stores software 1280 implementing one or more innovations described herein, in the form of computer-executable instructions suitable for execution by the processing unit(s) 1210, 1215.

A computing system 1200 may have additional features. For example, the computing system 1200 includes storage 1240, one or more input devices 1250, one or more output devices 1260, and one or more communication connections 1270. An interconnection mechanism (not shown) such as a bus, controller, or network interconnects the components of the computing system 1200. Typically, operating system software (not shown) provides an operating environment for other software executing in the computing system 1200, and coordinates activities of the components of the computing system 1200.

The tangible storage 1240 may be removable or non-removable, and includes magnetic disks, magnetic tapes or cassettes, CD-ROMs, DVDs, or any other medium which can be used to store information in a non-transitory way and which can be accessed within the computing system 1200. The storage 1240 stores instructions for the software 1280 implementing one or more innovations described herein.

The input device(s) 1250 may be a touch input device such as a keyboard, mouse, pen, or trackball, a voice input device, a scanning device, or another device that provides input to the computing system 1200. The output device(s) 1260 may be a display, printer, speaker, CD-writer, or another device that provides output from the computing system 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 12—Cloud Computing Environment

Figure 13:
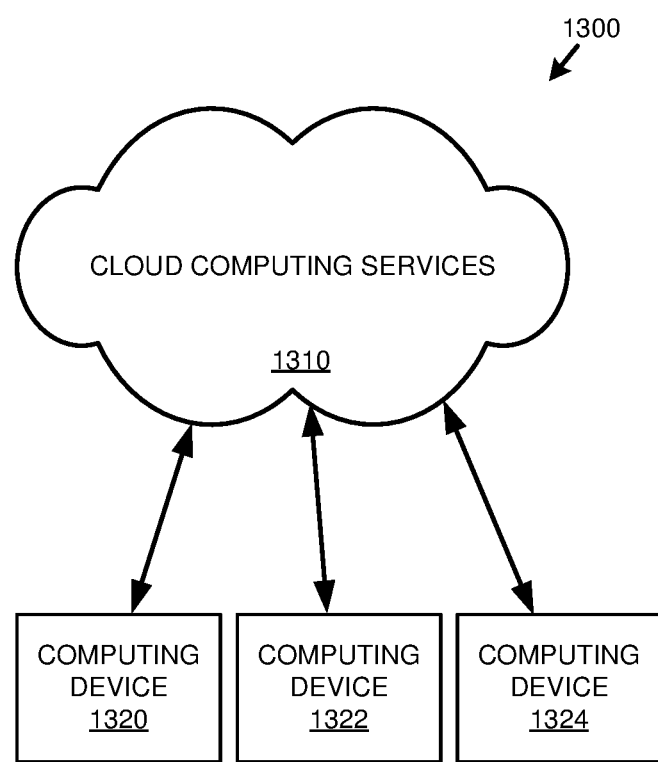
FIG. 13 is an example cloud computing environment that can be used in conjunction with the technologies described herein.

FIG. 13 depicts an example cloud computing environment 1300 in which the described technologies can be implemented. The cloud computing environment 1300 comprises cloud computing services 1310. The cloud computing services 1310 can comprise various types of cloud computing resources, such as computer servers, data storage repositories, networking resources, etc. The cloud computing services 1310 can be centrally located (e.g., provided by a data center of a business or organization) or distributed (e.g., provided by various computing resources located at different locations, such as different data centers and/or located in different cities or countries).

The cloud computing services 1310 are utilized by various types of computing devices (e.g., client computing devices), such as computing devices 1320, 1322, and 1324. For example, the computing devices (e.g., 1320, 1322, and 1324) can be computers (e.g., desktop or laptop computers), mobile devices (e.g., tablet computers or smart phones), or other types of computing devices. For example, the computing devices (e.g., 1320, 1322, and 1324) can utilize the cloud computing services 1310 to perform computing operators (e.g., data processing, data storage, and the like).

Example 13—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 12, computer-readable storage media include memory 1220 and 1225, and storage 1240. The term computer-readable storage media does not include signals and carrier waves. In addition, the term computer-readable storage media does not include communication connections (e.g., 1270).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C#, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented in a computing system comprising a memory and one or more processors, comprising:
   receiving one or more database table identifiers;
   for a first database table of a plurality of database tables, the first database table associated with a first database table identifier of the one or more database table identifiers, setting the first database table as a current database table;
   for the current database table, carrying out first analysis operations comprising:
      retrieving a first plurality of semantic identifiers, the first plurality of semantic identifiers associated with respective fields of the current database table;
      setting a current set of semantic identifiers to the first plurality of semantic identifiers;
      for given semantic identifiers of at least a portion of semantic identifiers of the current set of semantic identifiers, carrying out second analysis operations comprising:
         determining one or more determined database tables of the plurality of database tables, other than the current database table, having a given semantic identifier currently being analyzed with the second analysis operations;
         for a determined database table of the one or more determined database tables, the determined database table being a next database table and the current database table having the semantic identifier currently being analyzed being a prior database table:
            carrying out third analysis operations comprising one or both of:
               adding an identifier of the determined database table to a set of semantically related database tables; or
               performing a value query on the determined database table and adding query results to a set of value query results, wherein a value query specifies one or more values, or criteria for determining the one or more values, to be searched for in the determined database table and retrieved if found;
            setting the next database table as the current database table and carrying out the first analysis operations for the current database table;
      determining that no further semantic identifiers of the current database table remain to be analyzed;
      setting the prior database table as the current database table;
      resuming the first analysis operations for the current database table;
      determining that no database table of the plurality of database tables associated with the one or more database table identifiers has semantic identifiers left to be analyzed; and returning one or both of the set of semantically related database tables or the value query results.

2. The method of claim 1, further comprising:
rendering the set of semantically related database tables for display, the rendering comprising:
displaying representations of the semantically related database tables in the set, the representations comprising semantic identifiers associated with respective database tables of the semantically related database tables; and
display links between semantic identifiers associated with semantically related database tables, wherein the links illustrate at least a pair of database tables of the semantically related database tables having a common semantic identifier.

3. The method of claim 1, wherein returning the set of semantically related database tables comprising saving the set.

4. The method of claim 3, further comprising:
receiving a value query;
retrieving the set of semantically related database tables; and
executing the value query on the set.

5. The method of claim 4, wherein the value query is specified at least in part using a query language.

6. The method of claim 1, wherein the first analysis operations further comprise:
determining that stopping criteria have been satisfied; and
ceasing the first operations in response to determining that the stopping criteria have been satisfied.

7. The method of claim 6, wherein the stopping criteria comprise a runtime limit.

8. The method of claim 6, wherein the stopping criteria comprise a threshold number of database tables in the set of semantically related database tables being satisfied.

9. The method of claim 6, wherein the stopping criteria comprise a result size associated with database tables of the set of semantically related database tables or the value query results.

10. The method of claim 1, further comprising:
receiving identifiers for one or more semantic identifiers that a database table must include to be included in the set of semantically related database tables.

11. The method of claim 1, further comprising:
receiving a value query, the value query specified at least in part using a query language.

12. The method of claim 1, wherein the second analysis operations further comprise:
determining a field identifier associated with the semantic identifier currently being analyzed in the next database table; and
storing the determined field identifier.

13. The method of claim 12, wherein performing a value query is carried out at least in part using the determined field identifier.

14. The method of claim 1, wherein the first plurality of semantic identifiers are retrieved from a data dictionary.

15. The method of claim 14, wherein the data dictionary is not located in a database layer.

16. The method of claim 1, wherein the value query is performed after all semantic identifiers of a current database table have been analyzed, the current database table having multiple semantic identifiers matching a semantic identifier of a prior database table, further comprising specifying at least a portion of the value query, the at least a portion of the value query comprising multiple permutations of semantic identifiers in the prior database table and a semantic identifier of the multiple semantic identifiers of the current database table.

17. The method of claim 1, further comprising:
specifying at least a portion of the value query, the specifying comprising determining a value of the current semantic identifier of the prior database table using a value of another semantic identifier of the prior database table.

18. The method of claim 1, wherein the second analysis operations further comprise:
determining that at least one determined database table of the one or more determined database tables is included in the set of semantically related database tables; and
not further performing the second analysis operations for the at least one determined database table.

19. A computing system comprising:
memory;
one or more processing units coupled to the memory; and
one or more non-transitory computer readable storage media storing instructions that, when loaded into the memory, cause the one or more processing units to perform operations comprising:
receiving a specification of a first set of one or more database tables, in a database system comprising a plurality of database tables, to be analyzed;
for the first set of one or more database tables, retrieving first semantic information comprising one or more elements;
recursively analyzing database tables of a second set of one or more database tables of the plurality of database tables that are semantically related to at least a portion of the first semantic information,
wherein, at each level of recursion, one or more database tables of the second set are analyzed to determine whether other database tables of the second set have matching semantic information to a database table of the one or more database tables of the second set being analyzed, the analysis proceeding to a next level of recursion for any database tables of the second set having matching semantic information and performing one or more of:
(1) adding database tables of the second set with matching sematic information to a set of semantically related database tables, or
(2) performing a value query on database tables of the second set with matching semantic information, and returning to a prior level of recursion when no more elements of the one or more elements of the first semantic information remain to be analyzed for a current level of recursion, wherein a value query specifies one or more values, or criteria for determining the one or more values, to be searched for in database tables of the second set and retrieved if found; and
returning one or more of the set of semantically related database tables or value query results.

20. One or more non-transitory computer-readable storage media storing computer-executable instructions for causing a computing system to perform processing comprising:
receiving one or more database table identifiers;
for a first database table of a plurality of database tables, the first database table associated with a first database table identifier of the one or more database table identifiers, setting the first database table to a current database table;

for the current database table, carrying out first analysis operations comprising:
- retrieving a first plurality of domains, the first plurality of domains associated with respective fields of the current database table;
- setting a current set of domains to the first plurality of domains;
- for at least a portion of the current set of domains, carrying out second analysis operations comprising:
  - determining a set of one or more other database tables of the plurality of database tables having a domain currently being analyzed;
  - for a database table of the set, the database table of the first set being a next database table and a database table of the set having the domain currently being analyzed being a prior database table:
    - carrying out third analysis operations comprising one or both of:
      - adding an identifier of the next database table to a set of semantically related database tables; or
      - performing a value query on the next database table and adding query results to a set of value query results, wherein a value query species one or more values, or criteria for determining the one or more values, to be searched for in the next database table and retrieved if found;
    - setting the next database table as the current database table and carrying out the first analysis operations for the current database table;
- determining that no further domains of the current database table remain to be analyzed;
- setting the prior database table as the current database table;
- resuming the first operations for the current database table;
- determining that no database table associated with the one or more database table identifiers has one or more domains left to be analyzed; and
- returning one or both of the set of semantically related database tables or the value query results.

* * * * *